United States Patent
Hackworth et al.

(10) Patent No.: US 7,516,153 B2
(45) Date of Patent: Apr. 7, 2009

(54) RENDERING DYNAMIC DATA IN A WEB BROWSER

(75) Inventors: Keith Hackworth, Buford, GA (US); Aaron Benoy, Atlanta, GA (US); Robert Smith, White, GA (US)

(73) Assignee: ATT Intellectual Property I, L.P., Bedminster, NJ (US)

( * ) Notice: Subject to any disclaimer, the term of this patent is extended or adjusted under 35 U.S.C. 154(b) by 248 days.

(21) Appl. No.: 11/289,256

(22) Filed: Nov. 29, 2005

(65) Prior Publication Data

US 2007/0124323 A1    May 31, 2007

(51) Int. Cl.
*G06F 17/00* (2006.01)
(52) U.S. Cl. .................................. 707/102; 715/234
(58) Field of Classification Search ........................ None
See application file for complete search history.

(56) References Cited

U.S. PATENT DOCUMENTS

| | | | |
|---|---|---|---|
| 5,701,461 A * | 12/1997 | Dalal et al. ..................... 707/4 |
| 6,026,433 A * | 2/2000 | D'Arlach et al. ............... 707/10 |
| 7,003,528 B2 * | 2/2006 | Dan et al. ....................... 707/102 |
| 2001/0005838 A1 * | 6/2001 | So .................................. 705/57 |
| 2002/0184043 A1 * | 12/2002 | Lavorgna et al. ............... 705/1 |
| 2003/0050995 A1 * | 3/2003 | Mateos ........................... 709/217 |

* cited by examiner

*Primary Examiner*—Tim T. Vo
*Assistant Examiner*—Jau-Shya Meng
(74) *Attorney, Agent, or Firm*—Hope Baldauff Hartman, LLC

(57) ABSTRACT

Methods for creating a data structure for a dynamic web page that is associated with an account are provided. The methods include providing a setup form for a data structure associated with the account, wherein the data structure includes at least one data format and at least one field. Additionally, the methods can include receiving a data structure name for the data structure, receiving at least one field name related to the at least one field, and receiving at least one data format related to the data in the at least one field.

9 Claims, 35 Drawing Sheets

／2620

```
<html>
<head>
<script Language="JavaScript">
function doit(criteria,search) {
this.location.href=page + "?" + criteria + "=" + search;
{
function replace(string,text,by) {
var strLength - string.length, txtLength = text.length;
if ((strLength ==0) I! (txtLength == 0)1 return string;
var i = string.indexOf(text);
if ((!i) SS (text != string.substring(0,txtLength))i return string;
if (i == -1) return string;
var newstr = string.substring(0,i> + by;
if (i+txtLength < strLength)
newstr += replace(string.substring(1+txtLength,strLength),text,by);
return newstr;
} function obfu(sStr) {
var ret=escape(sStr);
ret=replace(ret,"+"," %2C"):
ret=replace(ret, "" ,"%22");
 ret=replace(ret,"'","%27"
 ret=replace(ret,"/","%2F");
return ret;
}
```

```
</SCRIPT>
<txtle>Sebastian's Italian Restaurant - Italian Restaurants - Jacksonville, FL</title>
<meta HTTP-EQUIV="Description" NflME="Description" Content="Sebastian's
Italian Restaurant, located in Jacksonville, FL, offers the finest seafood, pasta, and
authentic
<meta HTTP="Keywords" NAME="Keywords" Content="sebastian's italian
restaurant, Jacksonville, fl, florida, chicken, veal, pasta, wine, italian food, Italian
restaurant,
<meta http-equiv="Content-Type" content="text/html; charset=iso-8859-I">
</head>

<body bgcolor="SFFFFCC" rightmargin="0" topmargin="0" leftmargin="0"
marginwidth="0" marginheight="O" bottoitmargin="0" link="S669966"
vlink="#CC0033" alink="#CC0033">
<center>
<table width="600" border="0" cellspacing="O" cellpadding="0" align="center"
bgcolor="SFFFFFF">
<tr>
<td>
<div align="center"> <font face="Verdana, Arial, Helvetica, sans-serif "ximg
src="/images/nav2. jpg" width="600" height="I95" alt="sebastian' s italian
restaurant </font> <font face="Verdana, Arial, Helvetica, sans-serif"> <p>
<table border=0 width=100%>
```

FIG. 26B

```
                                                            ⟋ 2620
        <script language=JavaScript>
        var out="";
2624 ⟍  var  criteria="";
      ⟍ var loc=document.location.href;
        var url=loc.split("?");
        var page=url[0];
        if (url.length>l) {
        criteria=url[l];
        }
2626a ⟍             ⟋ 2626b           ⟋ 2626c
        var template=obfu("<tr><td><b>~DISH~</b></td><td rowspan=3 align=right
        valign=top> ~PICTURE~</td></tr><tr><td valign=top> ~DESCRIPTION~</
        td></tr><tr><td align=right><i>~PRICE~</i></td></tr><tr><td><br><br></td></
        tr>"); 2626d ⟋          ⟋ 2628b        ⟋ 2628c   2626e ⟋
2628a ⟍
        var mystr="/cgi-bin/dbq? Account = restaurant & table = menu & template=" +
        template + "&" + criteria;            2628d ⟋
2629 ⟍
        document.write("<SCRIPT language = 'JavaScript' src='" + mystr + "'");
        document. write ("></SCRIPT");
        document.write(">");

</SCRIPT>
        <script language="JavaScript">
        document.write(out);
        </SCRIPT>
        </table>
        <P>
```

```
<font face = "Verdana, Arial, Helvetica, sans-serif"><font size="3"><b><br>
Sebastian's Italian Restaurant</b></fontxfont size="2"><br>
10601 San Jose Blvd. & cbsp; <b>:: &nosp; & nbsp; </b>Jacksonville, FL 32257<br>
</font><font face = "Verdana, Arial, Helvetica, sans-serif" size = "2"> (904)
"2"xbr>
268-4458 <b>::</b> E-Mail: & nosp <a href="mailto:mendezmn@aol. com" target
="_blank">mendezmn@aol.com</a></font><font size = "2"> <br>
</font><br>
<font size="2">[  <a href="index.html">Welcome</a>  ] & shsp [ <a
href="page2.html">Our Menu </a> ] & nbsp [<a href ="page3. html ">Fine Cuisine</a>
]</font><br>
<br>
<font size="-2">Copyright " 2001 all  Rights  Reserved.<br>
<a hraf="http://www.realpages.com/" target="_blank">Intelligent Media
Ventures, LLC</a></fontx/font> </div> </td> </tr> </table> <table width = "600"
border="0" cellspacing="0" cellpadding="0" align="center">
<tr>
<td><img src = "http://lmcoln.imvi.bis.com/sites/sebastiansitalianrestaurant/images/
footer,gif" widfch="600" height="39"  alt="sebastian's  Italian  restaurant"></td>
</tr>
</table>
</center>
<map name = "Map">
<area shape = "rect" coords="17,165,94,186" href="index.html" alt="welcome"
title="welcome">
<area shape = "rect" coords="116,163,206,187" href="Ztable5.html"  alt="our menu"
title="our menu">
<area shape = "rect" coords="230,163,336.187" href="/table6.html" alt="fine  cuisine"
title="fine cuisine">
</map>
</body>
</html>
```

FIG. 26D

RENDERING DYNAMIC DATA IN A WEB BROWSER

CROSS REFERENCE TO RELATED APPLICATIONS

This application is related to copending U.S. Utility Patent Applications entitled "Generic Application Processing of Specific Dynamic Database Web Site Content," Ser. No. 11/288,483 filed on Nov. 29, 2005; "Web Site Content Management," Ser. No. 11/288,503 filed on Nov. 29, 2005; and "Field Name Abstraction for Control of Data Labels" Ser. No. 11/289,149 filed on Nov. 29, 2005, which are hereby incorporated by reference herein in their entirety.

BACKGROUND

As the Internet has become more mainstream, Internet patrons have become more demanding of the web sites they visit. While Internet patrons once were satisfied with static web pages that provide only textual information, now web sites are expected to provide much more. As more information is demanded from a web site and as market competition on the Internet has increased, web site owners have responded by providing dynamic web pages that include not only text, but also pictures, video, and other data on their web sites.

While this configuration can cause inefficiency in developing web sites, another problem that can result is the inefficiency in the management of the dynamic data on a web site. When an advertiser (web site owner) provides an Internet Service Provider (ISP) or other entity with a desired web site format and included data, the advertiser generally expects that the data can change over time. As a nonlimiting example, an automobile dealer who owns a web site will generally expect that the inventory will change. Therefore, to remain current, the data on the web site will also likely change.

One implementation of a web site with dynamic data includes a Common Gateway Interface (CGI) script that provides the dynamic data. The CGI can receive a request from an Internet user and provide the desired information. The web site can include a database for the customer and have the CGI access the data when the web page is requested. A web site developer can create such a web site, however when creating multiple web sites, the web site developer (or web site designer) can encounter any of a number of problems, including efficiency issues with regard to creation and management of each web site.

There are presently various ways to remedy these problems. First, the web developer can customize an application and database for the web site. This usually takes a lot of time and includes a significant increase in programming that is generally not reusable between web sites. Another option is to build a generic system that can work for many web sites. A problem with this approach is that the data usually does not have the same flow as the other pages on the web site. Additionally a generic system also generally has limited customization. Field names are frequently generic names and the database can handle only certain types of data. Regardless of which implementation is utilized, an on-staff Database Administrator (DBA) is normally desired to manage data that is being displayed. A developmental team including a DBA, CGI programmer, and a web designer is generally desired to build a tool for an advertiser to dynamically update a web site. Since the data in the web site is changing, the presentation of the data may also change, and therefor the Web designer can be consulted by the advertiser to change the HTML code associated with the web site to facilitate the change in data. In fact, significant changes such as adding a new field to the database could require the efforts of the entire team to implement. Inefficiencies in this process can become costly for the advertiser.

Thus, a heretofore unaddressed need exists in the industry to address the aforementioned deficiencies and inadequacies.

SUMMARY

Embodiments of the present disclosure can be viewed as providing methods for creating a dynamic web page. In this regard, one embodiment of such a method, among others, can be broadly summarized by the following steps: providing a setup form for creating a data structure associated with the account; receiving user input for creating at least one customizable field in the data structure; receiving at least one field name related to the at least one customizable field; receiving at least one data format related to data for the at least one customizable field; and creating the data structure with the at least one customizable field, wherein the data structure is configured to grant access to at least a portion of data in the data structure when rendering the dynamic web page.

Embodiments of the present disclosure also provide computer readable mediums for creating a dynamic web page. Briefly described, one embodiment of the computer readable medium, among others, can include logic configured to provide a setup form for creating a data structure associated with the account and logic configured to receive user input for creating at least one customizable field in the data structure. Additionally, embodiments also include logic configured to receive at least one field name related to the at least one customizable field, logic configured to receive at least one data format related to data for the at least one customizable field and logic configured to create the data structure with at least one customizable field.

Other systems, methods, features, and advantages of the present disclosure will be or become apparent to one with skill in the art upon examination of the following drawings and detailed description. It is intended that all such additional systems, methods, features, and advantages be included within this description and be within the scope of the present disclosure.

BRIEF DESCRIPTION

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 26A is exemplary computer code illustrating a nonlimiting example of HTML that can be created to display dynamic data such as in the web page from FIGS. 13 and 14.

FIG. 26B is a continuation of the HTML code from FIG. 26A.

FIG. 26C is a continuation of the HTML code from FIGS. 26A and 26B.

FIG. 26D is a continuation of the HTML code from FIGS. 26A, 26B, and 26C.

DETAILED DESCRIPTION

Figure 1A:
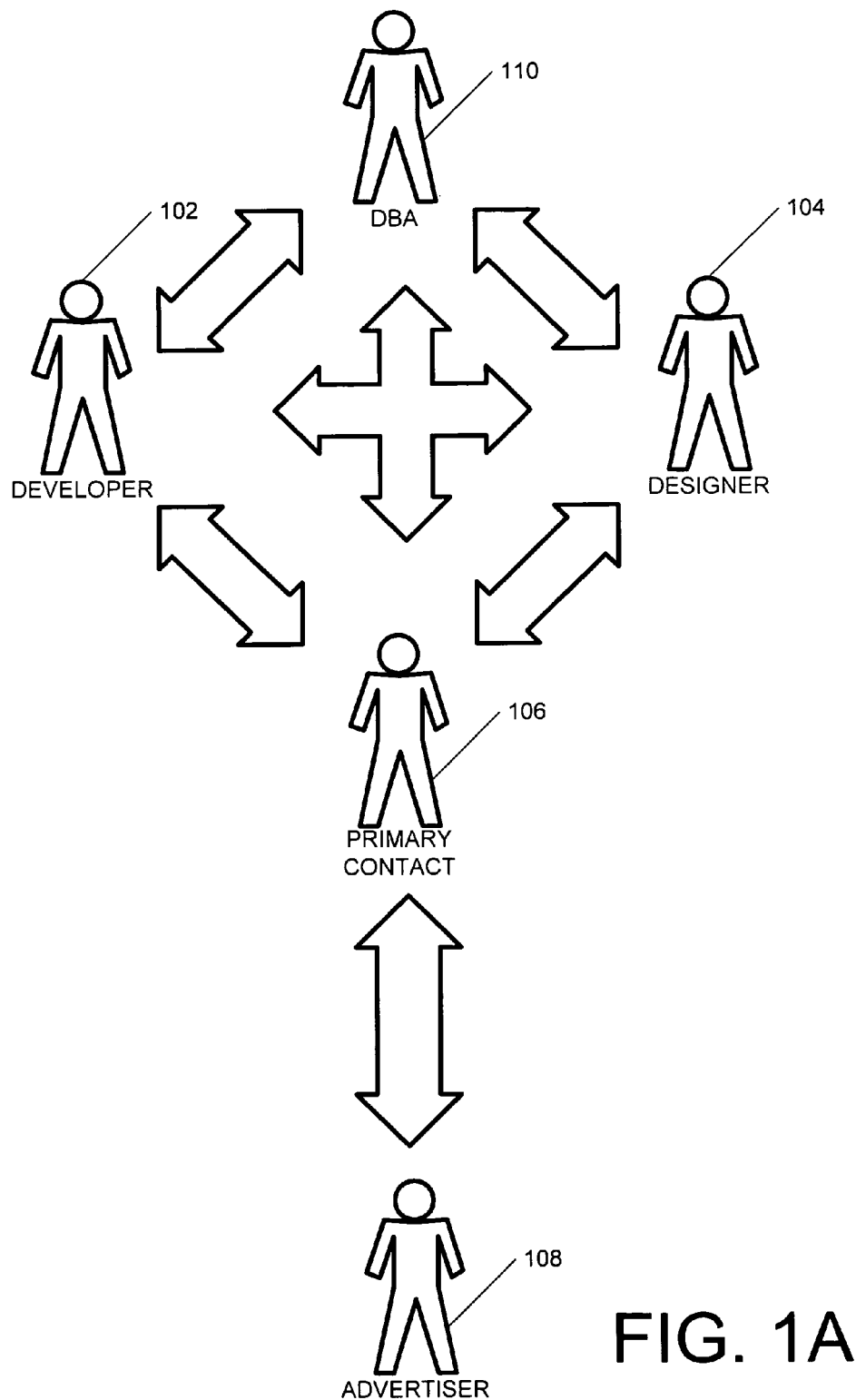
FIG. 1A is a functional flow diagram illustrating an exemplary standard configuration for creating a web site for an advertiser.

Exemplary embodiments described in this disclosure provide the ability to easily integrate dynamic content into a custom-built web site, where the web site owner can manage his or her own data. At least one embodiment of the present disclosure allows web site developers to customize a web site using templates. This can allow the web site owner (advertiser) to upload files and modify text without involving the web site designer. The web site designer can create the layout of the data in a database or other data storage logic with little database knowledge and without the assistance of a Database Administrator (DBA). Field names on the web site can be specific to the web site, so the web site has the appearance of a custom solution. Additionally, at least one embodiment of the present disclosure can be configured to operate without modifying the application layer. Filters and other requests can be handled directly by a scripting language, such as JavaScript, and HTML in the web page, which can be a pre-configured template that the designer uses for a plurality of web sites.

At least one embodiment of the present disclosure includes a database setup tool (dbsetup) and a CGI program (Common Gateway Interface) that allows a web site designer to create a table, create columns in the table, and select the type of data used for each column. A web designer can choose column names he or she desires to make the table appear to be a custom solution for the web site. The designer may also create multiple tables for a single web site. One should note that, while this document refers to creating and manipulating a table, this is a nonlimiting example, as any data structure can be used.

Also included in this disclosure is a database update tool (dbupdate), which provides the web site owner with a way to populate and manage the data in the database. The database update tool can be a simple web page with standard HTML form, TEXTAREA and FILE input types with "Save" and "Delete" buttons. In at least one embodiment, the rows and columns can be designated as either a text-area or a file entry field. The advertiser can add, delete, and modify rows in the table. The database update tool can also provide the user with a way to upload any binary files and any text they wish, which allows the upload of video, images, documents, and other binary files. The database update tool can also read the type definition of the binary file from the web browser while it is being uploaded. That information can be stored in the database (or other data storage logic), so when the binary file is requested, the proper HTTP headers can be added.

In at least one embodiment, a single line of JavaScript can be modified to change the web page presentation. A template variable line that describes the presentation of the data elements of the web page to the HTML renderer of the web browser can be amended for this purpose. For each row in the table (after applying an optional filter), the template line can be repeated. Elements from the database can be inserted into the line by ~COLUMN_NAME~ in the template line (one should note that the indicators "~" and "~" are used in this document to signify the beginning and end of computer code within the text). As a nonlimiting example, a template that includes a column called "NAME" could include a parameter such as ~NAME~. The code inside the template line can be HTML or JavaScript (or both). This can allow an HTML page to respond as if it were a CGI. The JavaScript can then process the requested Uniform Resource Locator (URL), such as "somepage.html?VALUE=something" differently than "somepage.html" alone, and also, without the need of a CGI.

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

FIG. 1A is a functional flow diagram illustrating an exemplary standard configuration for creating a web site for an advertiser. As illustrated, an advertiser 108 can communicate with a primary contact 106 of an Internet Service Provider (ISP) or other entity that provides the ability to create and host a web site. A primary contact 106 can determine format and other features that the advertiser 108 wishes to display on the web site. This communication can be general or detailed depending on the desires of the advertiser 108. As a nonlimiting example, the advertiser 108 may want to have specific data displayed in specific colors according to a specific flow. The advertiser 108 can indicate that the web site should provide a certain functionality, and so forth.

The primary contact 106 can send the information received from the advertiser 108 to a developer 102 for creation of the web site. The developer 102 can be a web developer who is fluent in various programming languages and protocols such as JavaScript. From the information received, the developer 102 can create an application with the functionality requested, working in concert with a DBA 110 who can create an optimized repository for this application in the form of databases, tables, and columns. Also, the developer 102 can create an interface to allow the advertiser 108 to update, add, and remove information according to the desires of the advertiser.

Additionally, the primary contact 106 can send the information received from the advertiser 108 to a designer 104 (or this information can be sent to the designer by the developer). The designer 104 can create the HTML code for displaying and providing the desired functionality. The designer 104 can incorporate the desired aesthetic qualities to functionality provided by the developer 102 for both the web page and the data management tool.

If the advertiser 108 has additional requests, or if the developer 102, designer 104, or DBA 110 have questions, the exemplary configuration of FIG. 1A provides that there is one point of contact between the advertiser and ISP. This means that the developer 102, designer 104, and DBA 110 communicate any questions to the primary contact 106. The primary contact 106 then relays these questions to the advertiser 108. This also means that if the advertiser 108 desires updates or revision to an existing web page, the advertiser 108 will normally contact the primary contact 106. Additionally, one should note that although FIG. 1A illustrates developer 102 and designer 104 as different entities, the developer 102 and designer 104 may or may not be the same person (or system).

While the exemplary system described with reference to FIG. 1A might be desirable for customer relations, it can become inefficient with regard to developing, designing, and maintaining a web site. Additionally, one should note that the system described in FIG. 1A is but a nonlimiting example, as other systems can be employed and still produce similar problems in the efficiency related to developing, designing, and maintaining a web site.

Figure 1B:
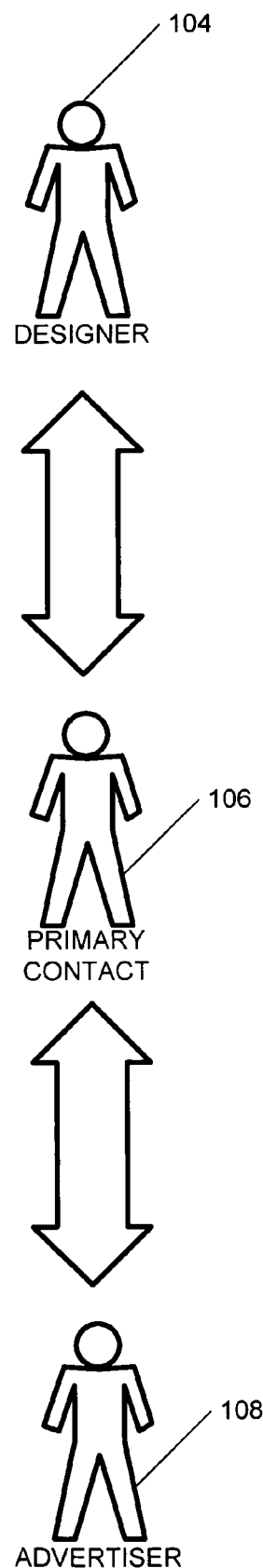
FIG. 1B is a functional flow diagram illustrating another exemplary standard configuration for creating a web site, similar to the diagram from FIG. 1A.

FIG. 1B is a functional flow diagram illustrating another exemplary standard configuration for creating a web site, similar to the diagram from FIG. 1A. While the example of FIG. 1A illustrated a DBA 110 and a developer 102, this nonlimiting example includes only a designer 104, a primary contact 106, and an advertiser 108. In this scenario, the designer 104 communicates information related to the advertiser's requests without the need for a DBA 110 and a developer 102.

Figure 2A:
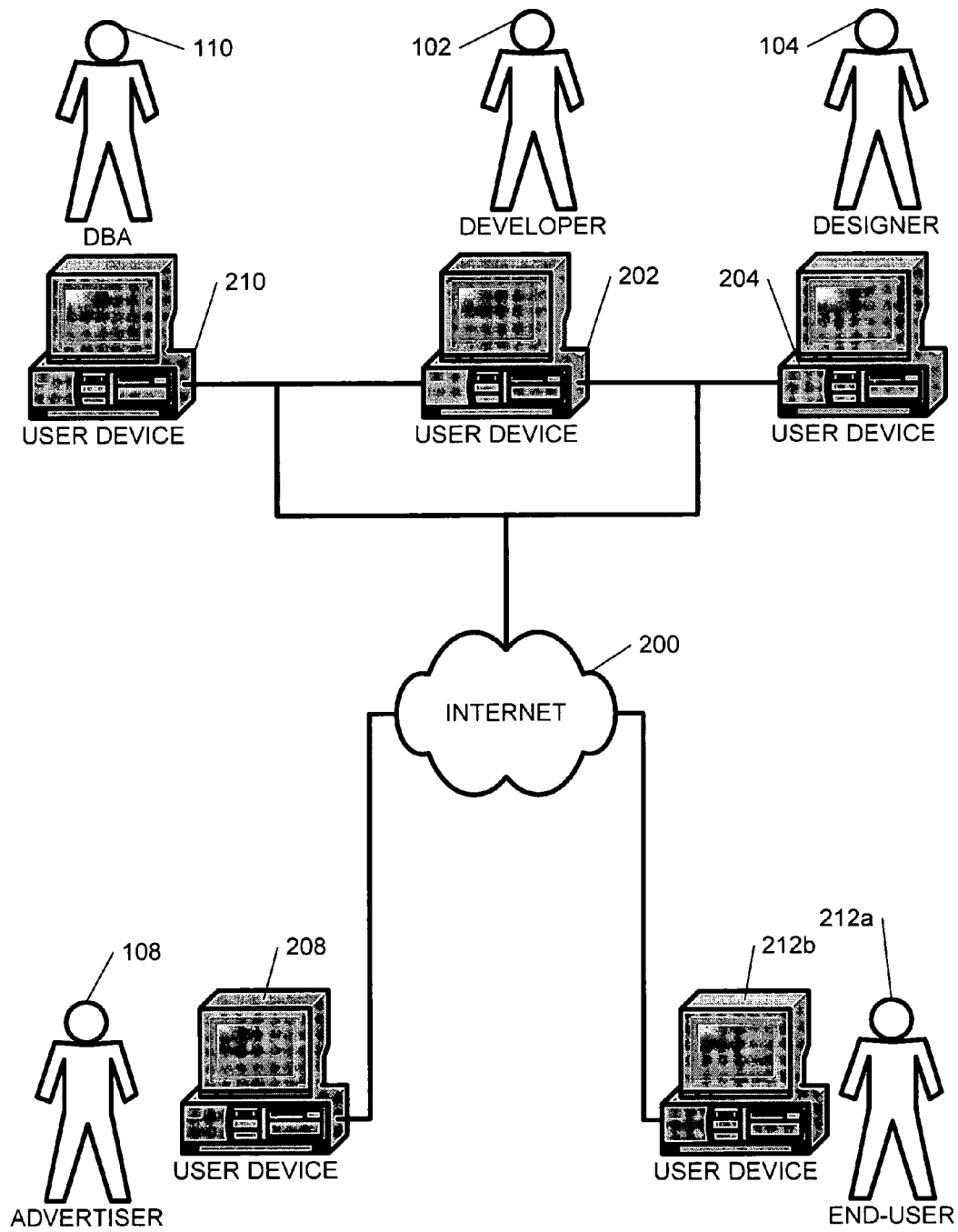
FIG. 2A is a functional network diagram illustrating an exemplary standard configuration for providing and managing a web site for the advertiser of FIG. 1A.

FIG. 2A is a functional network diagram illustrating an exemplary standard configuration for providing and managing a web site for the advertiser of FIG. 1A. As illustrated, the advertiser 108 can be coupled to the Internet 200 via user device 208. Additionally, the designer 104 can operate a user device 204 that is coupled to both the Internet 200 and a user device 202 that is controlled by the developer 102. The user device 202 can also be coupled to the Internet 200. A DBA 110 can control user device 210, which is coupled to Internet 200. Additionally an-end user 212a can operate a user device 212b that is also coupled to the Internet 200.

Although not illustrated in FIG. 2A, the developer 102, designer 104, and DBA 110 can be coupled together via a network or other means to facilitate communication of information for the purpose of creating the desired web page for the advertiser 108. The developer 102, designer 104, and DBA 110 can also be coupled to the Internet 200 either directly or via a network that is configured to provide a web site that is created by the developer 102, designer 104, and DBA 110 to the end user 212.

Figure 2B:
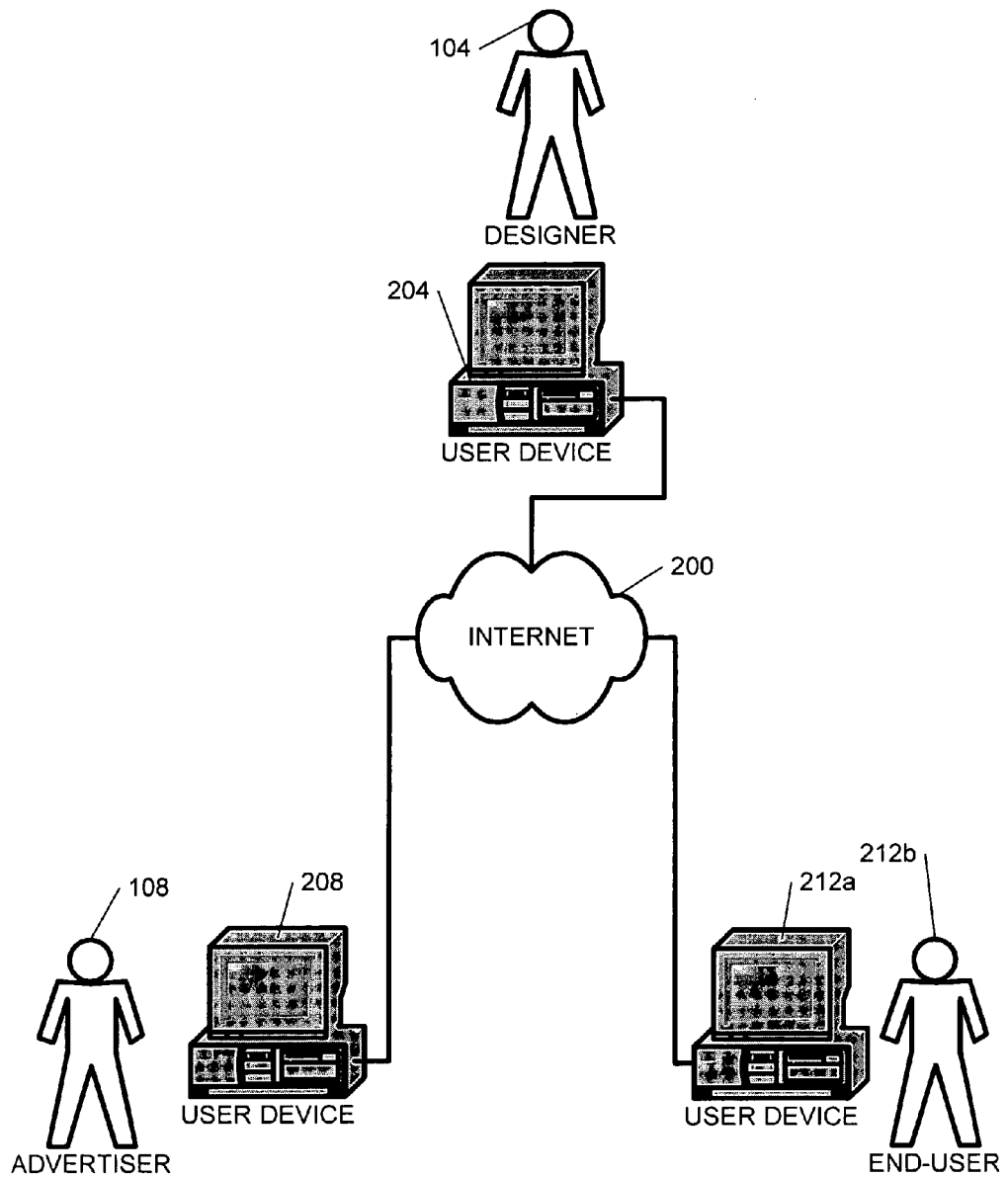
FIG. 2B is a functional network diagram illustrating another exemplary standard configuration, similar to the diagram from FIG. 2A.

FIG. 2B is a functional network diagram illustrating another exemplary standard configuration, similar to the diagram from FIG. 2A. As illustrated in FIG. 2B, the designer 104 operates a user device 204 that is coupled to the Internet 200. An advertiser 108 operates a user device 208, which is also coupled to the Internet. The end-user 212a operates a user device 212b that is also coupled to the Internet. While the nonlimiting example of FIG. 2A illustrates that a DBA 110 and a developer 102 can also participate in creation and management of a web site designed for the advertiser 108, FIG. 2B illustrates that this is not a requirement. In the nonlimiting example of FIG. 2B a designer 104 can create and manage a web site for an advertiser, as discussed below.

Figure 3:
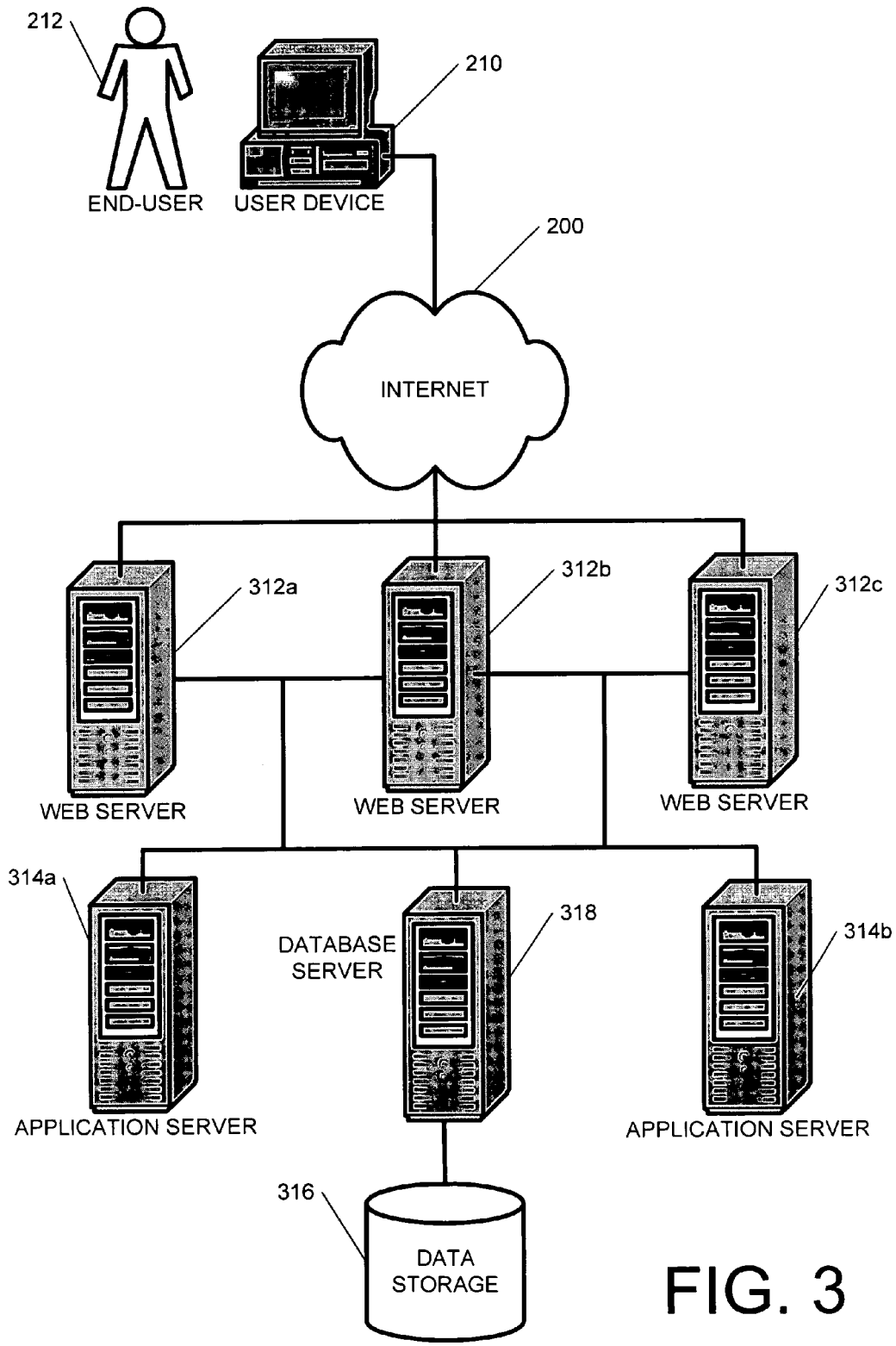
FIG. 3 is a functional network diagram illustrating an exemplary configuration for providing a web site to the end-user from FIG. 2A.

FIG. 3 is a functional network diagram illustrating an exemplary configuration for providing a web site to the end-user from FIG. 2A. As illustrated, the end user 212 operates a user device 210 that is coupled to the Internet 200. Web servers 312a, 312b, and 312c (collectively referred to as 312), can provide a web site to a user device, however application servers 314a and 314b (collectively referred to as 314) can provide a desired web site as well. Data storage logic 316 can also be coupled to the web servers 312 and application servers 314.

Web servers 312 may serve to communicate HTML (Hypertext Markup Language) code to the user device 210, and may also serve various other functions, depending on the desires of the network. Historically, web servers 312 were capable only of communicating HTML communications to and from the user device 210. However, present day web servers 312 may be capable of running scripts, loading streaming video, and many other functions traditionally reserved for application servers 314.

The application servers 314 have traditionally enabled a web host to provide streaming video, and other dynamic applications that the web servers 312 were unable to handle. However, the application servers 314 may also act as a web server 312, if network desires. In the exemplary embodiment of FIG. 3, both application servers 314 and web servers 312 are utilized to facilitate Internet traffic to the web site.

Also included in network of FIG. 3 is a database server 318 and data storage 316 (which can take the form of a database or other data storage logic). Data storage 316 is coupled to application servers 314 and may be configured to store data for access by the application servers 314. Data storage logic 316 can store other data utilized by the application servers 316 or data regarding user 212 or user device 210.

One should note that the components described with reference to FIG. 3 are generally associated with an Internet Service Provider (ISP) that is hosting the web site. This ISP can be associated with the developer 102 and web designer 104 from FIG. 2A. As such, the web developer 102 and the web designer 104 can also access data on the web site through the Internet 200, similar to the configuration with end-user 212. Other configurations might also enable the web developer 102 and web designer 104 to access the desired setup applications without the Internet. The user devices 202 and 204 may be connected to the web servers 312 or application servers 314 (or both) without access to the Internet 200. Such a configuration could include a local area network (LAN), a wide area network (WAN), or other similar configuration.

One should also note that the network components illustrated in FIG. 3 are included for the purpose of explanation, not limitation. The components discussed with respect to FIG. 3 can be removed or substituted with other components so long as the desired results are achieved. Similarly, other components can also be included to provide added functionality, if desired. As a nonlimiting example, one or more of the web servers may be removed, depending on the desired functionality of the network. As another nonlimiting example, one or more of the application servers may be removed if desired. The desires of the particular ISP or web host can dictate the desired network configuration.

Figure 4:
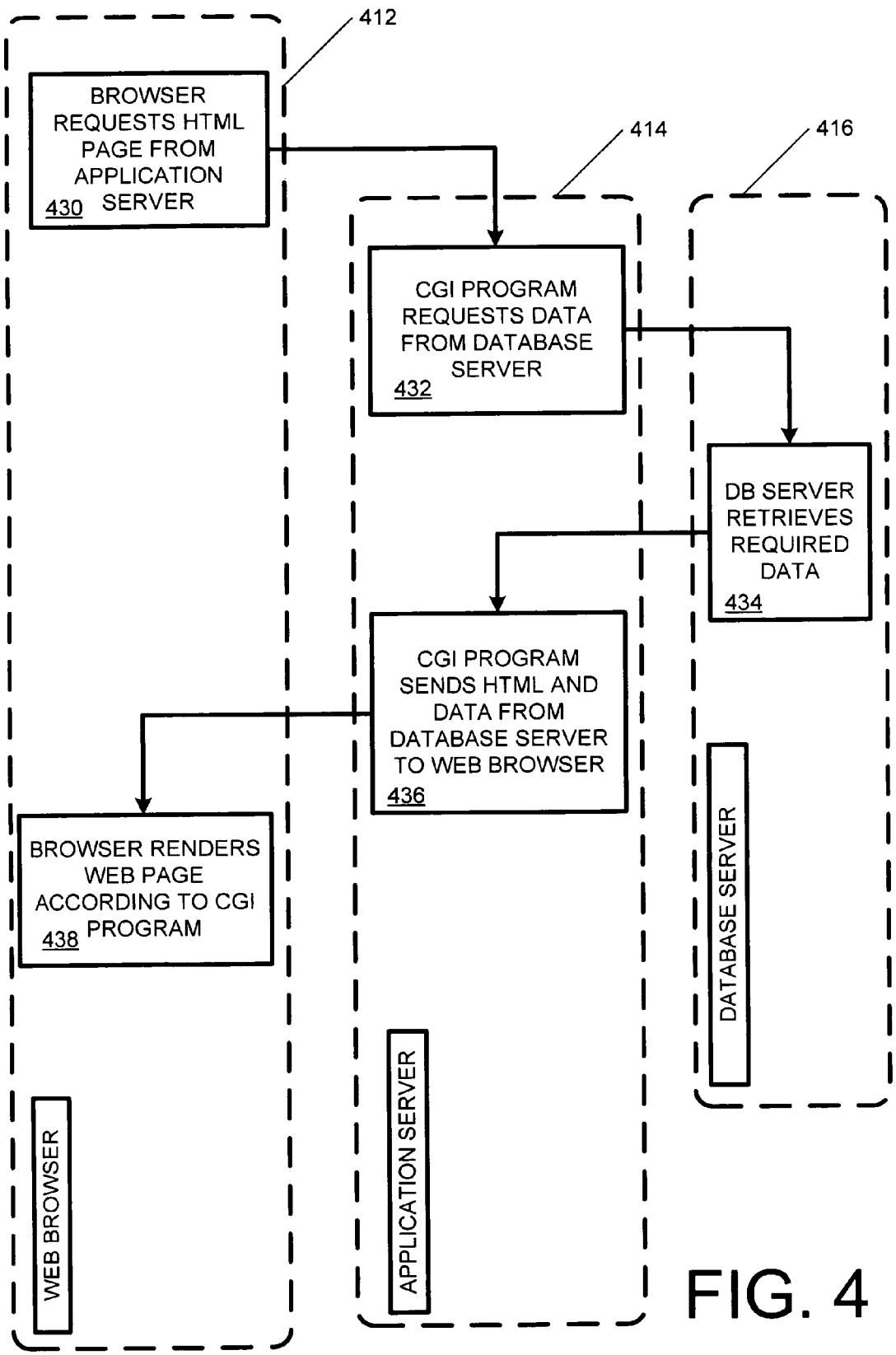
FIG. 4 is a functional flow diagram illustrating exemplary steps that may be taken to provide a web site to the end-user from FIG. 2A.

FIG. 4 is a functional flow diagram illustrating exemplary steps that may be taken to provide a web site to the end-user from FIG. 2A. As illustrated, in step 430 the web browser 412 requests a HyperText Markup Language (HTML) page from the application server 414 (block 430). Next, a CGI program requests data from a database server 416 (block 432). Depending on the particular configuration, the web servers or application servers (or data storage logic) could also serve the functions of a database server.

The database server 416 then retrieves the requested data (block 434). Next, the CGI program sends HTML code and the data retrieved from the database server 416 to the web browser 412 (block 436). Finally, the web browser 412 renders the web page according to the CGI program (block 438).

As illustrated in this flowchart, the CGI can be located on the application server 414, and when executed, can provide the requested web page to the user's web browser 412. While such a configuration can provide dynamic data for a web page to a user's web browser, this configuration can be difficult to manage, as the CGI generally will be amended to update information in the data storage server 414 (or data storage 316 or 516 from FIGS. 3 or 5, respectively). For many web pages, this means that the advertiser 108 (FIG. 1A) contacts the primary contact 106 so that that web developer 102, web designer 104, or DBA 110 (or any permutation of the three) can make the desired changes. For an advertiser 108 who constantly or regularly changes a database structure on a web site, this process can become expensive and inefficient.

Figure 5A:
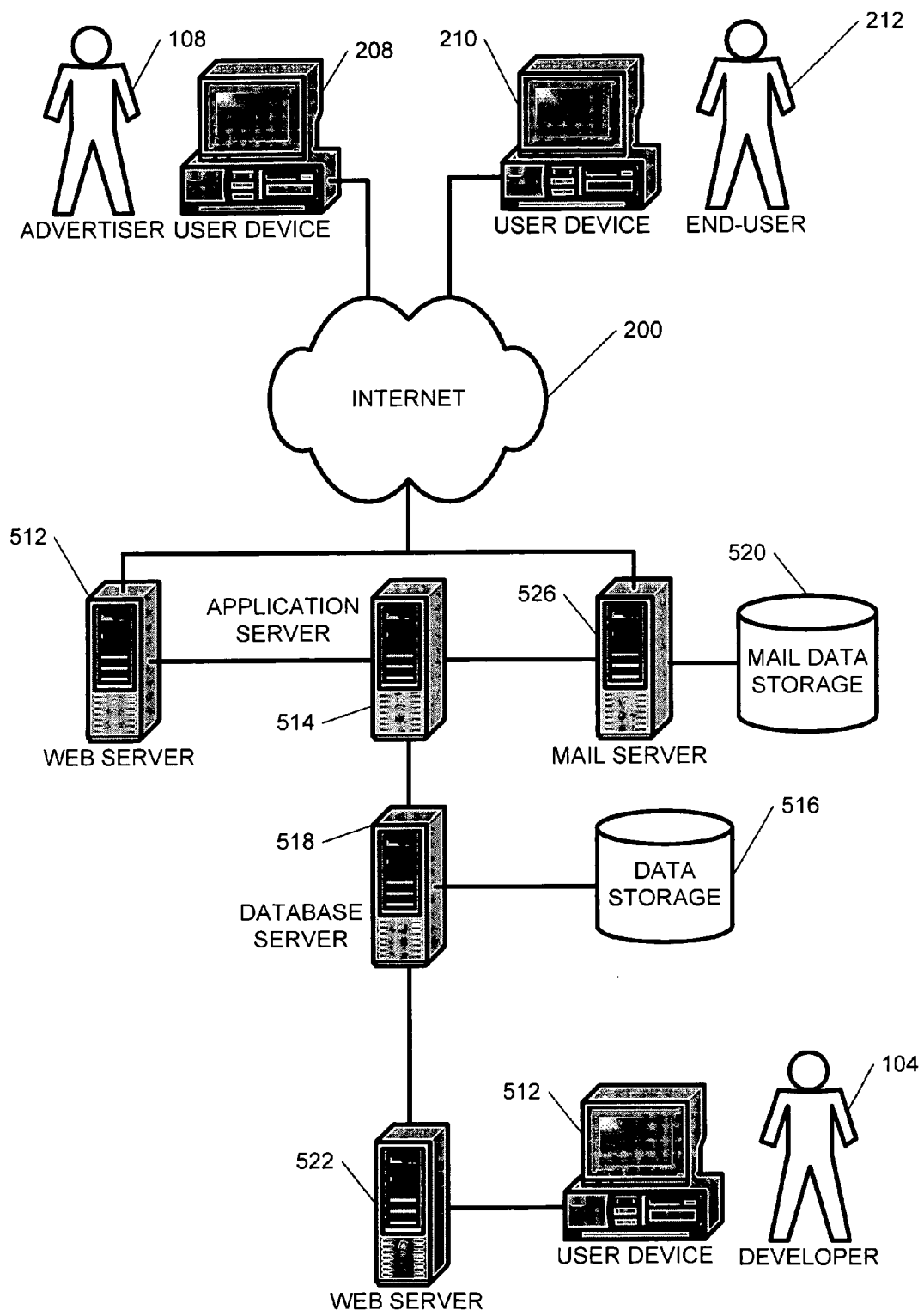
FIG. 5A is another exemplary functional network diagram illustrating a configuration for providing a web site to the end user from FIG. 2A.

FIG. 5A is another exemplary functional network diagram illustrating a configuration for providing a web site to the end user from FIG. 2A. As illustrated, an end-user 212 can operate a user device 210 that is coupled to the Internet 200. An advertiser 108 can also be coupled to the Internet via user device 208. Additionally, web server 512 (which may include a single web server, as illustrated in FIG. 5A or may include a plurality of web servers as illustrated in FIG. 3) is coupled to the Internet 200, application server 514 (which may include a single application server or a plurality of application servers), and mail server 526. Mail server 526 (which may also include a single mail server, as illustrated or may include a plurality of mail servers) is coupled to the Internet 200 as well as being coupled to mail data storage logic 520. The mail server 526 and web server 512 are also coupled to database server 518, which is coupled to data storage 516. Also coupled to the database server is a web server 522, which is coupled to a user device 512 being operated by developer 104.

In this nonlimiting example, the web developer 104 can create a web site via user device 512. The web site can be completed and communicated to data storage logic 516 via web server 522. One should note that while not illustrated, web server 522 may be configured to access data storage logic 516 via the Internet, however this is not a requirement.

During the web site design, the designer 104 can have access to a dbsetup program. The dbsetup program can provide the designer 104 with a way to easily create a table (or tables) for the web site. As discussed below, the dbsetup program can allow the web designer 104 to designate the types of data that can be included in the table, as well as other data such as table name, column name, field name, etc. Use of the dbsetup program can alleviate the need for DBA involvement in such a project.

Once the designer 104 creates the web site, the web site can be stored with data storage logic 516 (FIG. 5A). This provides an end user 212 with access to the web site via the Internet 200 and web server 512. Additionally, the advertiser 108 can access the mail server 526 to manage the web site. More specifically, in at least one embodiment, administrative controls can be provided to an advertiser 108 via Internet 200 access to the mail server 526. If the advertiser 108 wishes to add, change, or remove data from the web site, the advertiser 108 can log onto the mail server 526, which can access the mail data storage logic 520. According to the data input, the mail server 526 can access the advertiser's account and provide options for web site management. While the mail server in this nonlimiting example provides a convenient access point for managing data, any authentication system with access credentials could be employed for this purpose.

One should note that a data dictionary can be built into the data storage 516 (or mail data storage 520 or both). The data dictionary can include columns, tables, lengths of fields, etc. The data dictionary can be incorporated into the data storage unit, or can, itself stand alone.

Figure 5B:
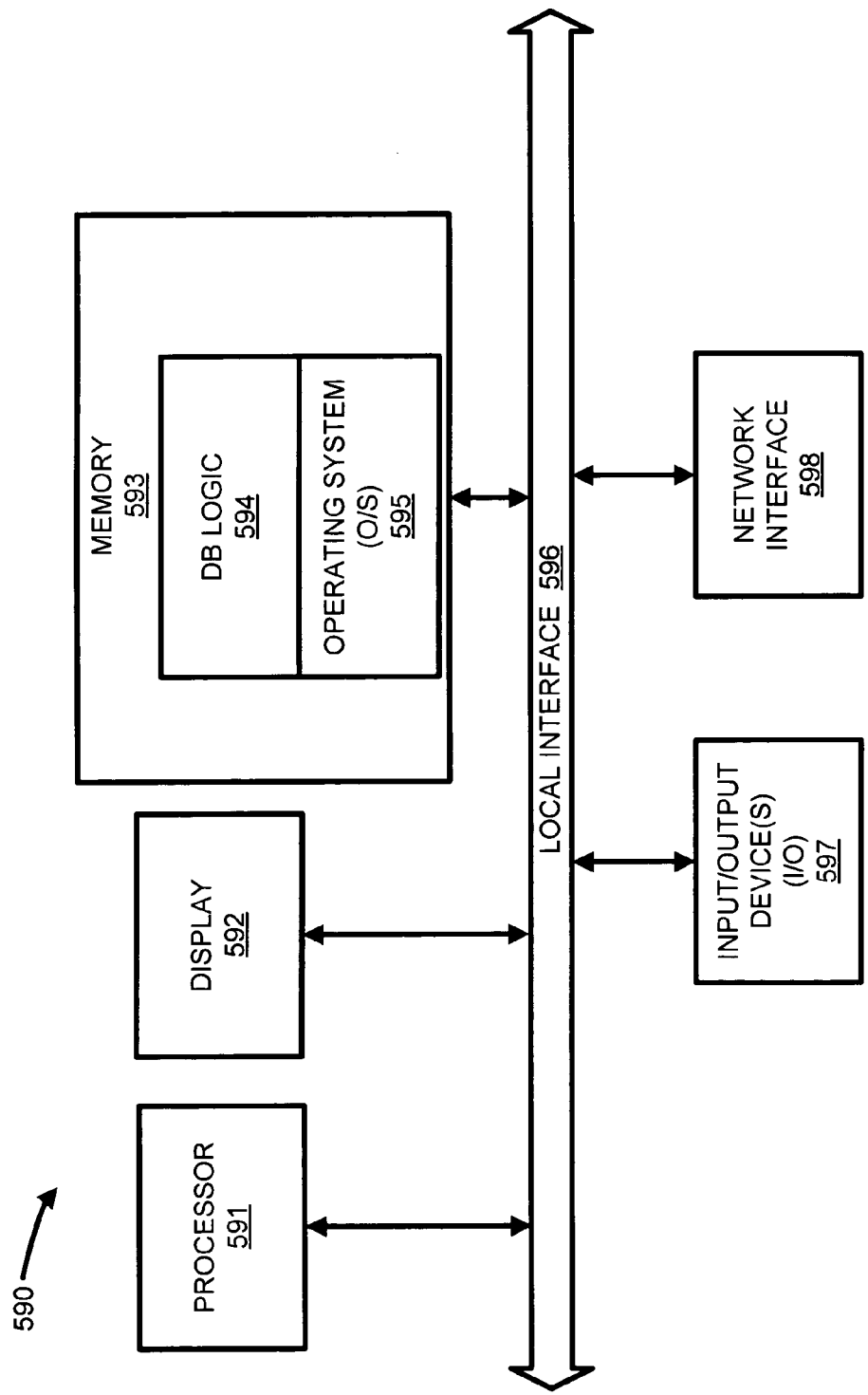
FIG. 5B is a functional block diagram showing an exemplary computer system having a dbsetub program, a dbupdate program, or a dbq program in accordance with an embodiment of the present disclosure.

FIG. 5B is a functional block diagram showing an exemplary computer system having a dbsetup program, a dbupdate program, or a dbq program (or any permutation of the three) in accordance with an embodiment of the present disclosure. As illustrated, computer 590 includes a processor 591, which controls operation of various components of the computer 590. The processor 591 is a hardware device for executing software, particularly that stored in memory 593. The processor 591 can be any custom made or commercially available processor, a central processing unit (CPU), an auxiliary processor among several processors associated with the computer 590, a semiconductor based microprocessor (in the form of a microchip or chip set), a macroprocessor, or generally any device for executing software instructions.

The memory 593 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 593 may incorporate electronic, magnetic, optical, and/or other types of storage media. Note that the memory 593 can have a distributed architecture, where various components are situated remote from one another, but can be accessed by the processor 591.

The software in memory 593 may include one or more separate programs, each of which includes an ordered listing of executable instructions for implementing logical functions. In the example of FIG. 5B, the software in the memory 593 includes one or more of the following: a dbsetup program, a dbupdate program, and a dbq program (collectively referred to as "db logic"), in accordance with an embodiment of the present disclosure and a suitable operating system (O/S) 595. The db logic 594 is a source program, executable program (object code), script, or any other entity including a set of instructions to be performed. The software in the memory 593 may further include a basic input output system (BIOS) (omitted for simplicity). The BIOS is a set of essential software routines that initialize and test hardware at startup, start the O/S 595, and support the transfer of data among the hardware devices. The BIOS is stored in ROM so that the BIOS can be executed when the computer 590 is activated. Thus, it will be appreciated that a variety of software may be installed into the computer system. Additionally included in this nonlimiting example is a display 592, input/output device(s) 597, as well as network interface 598, which can be coupled to local interface 596.

One should note that depending on the particular implementation, the components illustrated in FIG. 5B can be present in a mail server (see element 518 from FIG. 5A), a web server (see elements 512 and 522 from FIG. 5A), a user device, or other at locations. Additionally, while one piece of logic (such as dbsetup) may be located at one location (such as on a web server), another piece of logic (such as dbupdate) may reside at another location (such as on a mail server). However, this is not a requirement. Depending on the implementation, web servers and mail servers, application servers and user devices may include the components illustrated in FIG. 5B.

Figure 6A:
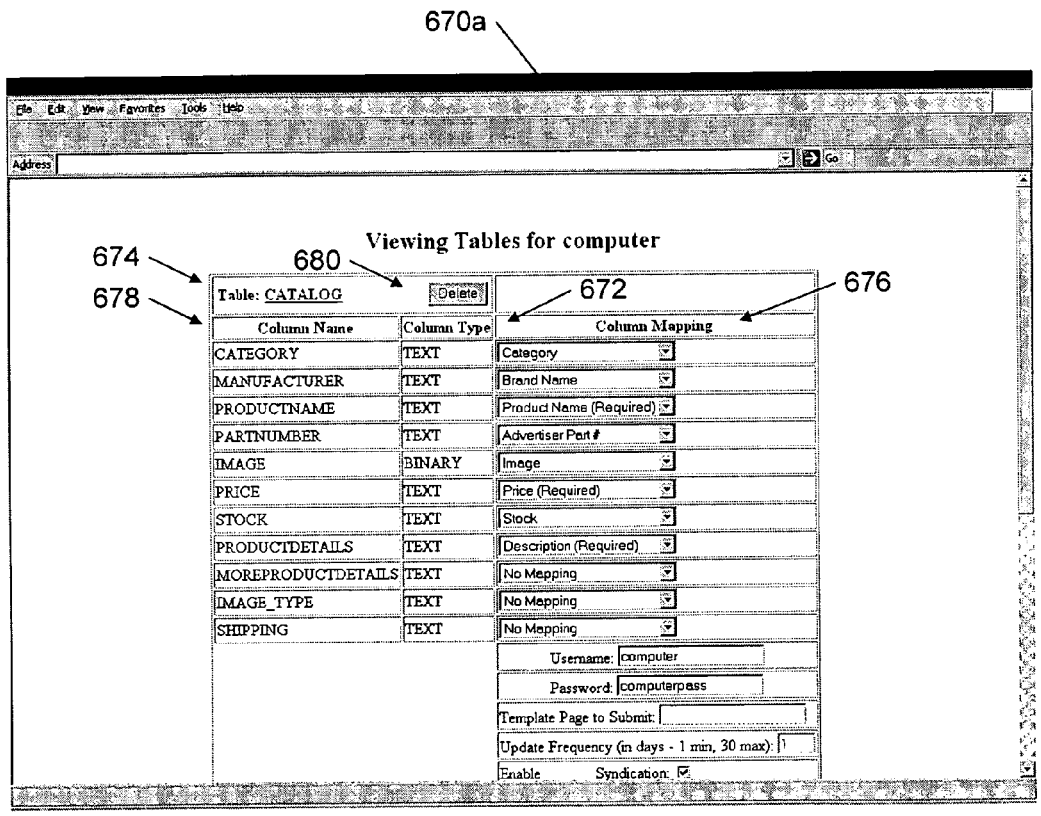
FIG. 6A is a screenshot of an exemplary dbsetup program for facilitating the creation of a web site for the advertiser from FIG. 2A.

FIG. 6A is a screenshot of an exemplary dbsetup program for facilitating the creation of a web site for the advertiser from FIG. 2A. As illustrated, window 670a includes a way for a web designer 104 to create a table for a web page without the necessity of involving a DBA. In this nonlimiting example, a dbsetup program facilitates the creation of a table that has been named "CATALOG," 674. The table has been created with eleven columns, each column with a column name 678. The column type is also designated for each column 672 as being text or binary. By selecting text, the column can be formatted to receive textual data directly via user input. Binary data can include other types of data such as pictures, video, music, documents, etc. If the user selects text data in the dbsetup program, a dbupdate program (described below) can provide the advertiser 108 with a text prompt for inputting the desired data for the web site. If, however the user selects binary data in the dbsetup program, the dbupdate program can provide the advertiser 108 with a file path prompt, a "browse" button, or other similar options to call the desired file. These options are discussed in more detail below. Also included in the dbsetup program is a column mapping field 676, which allows the designer 104 to syndicate data to other partners.

Figure 6B:
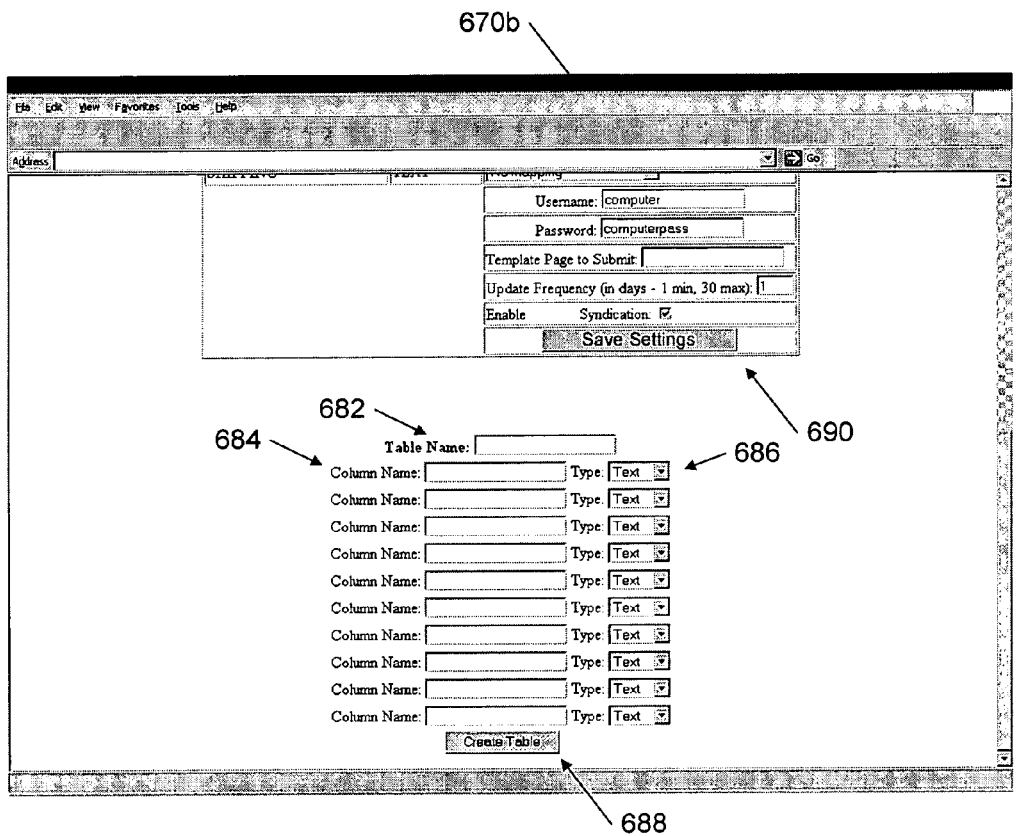
FIG. 6B is a continuation screenshot of an exemplary dbsetup program from FIG. 6A.

FIG. 6B is a continuation screenshot of the exemplary dbsetup program from FIG. 6A. One should note that the "save settings" option 690 is part of the data syndication. A new table can be created by entering the desired information. More specifically, a table name prompt 682 allows the designer 104 to enter a name for the new table. Additionally, the designer 104 can enter a column name in the column name field prompt 684. The designer 104 can create a table with any number of columns, depending on the particular implementation. In the nonlimiting example of FIG. 6B, there is a ten column limit.

The designer 104 can additionally select the type of data that will likely be input into each column in the data type pull down option 686. The types of data that can be selected in FIG. 6B are text or binary. By selecting text, the developer is indicating that the designated column will likely include textual data. If the binary option is selected, the developer is indicating that pictures, video, music, documents, etc. will be used in that column. One should note that while the nonlimiting example in FIG. 6B illustrates a pull down menu with the two options, this is but a nonlimiting example. The data type option may or may not be a pull down menu and an option may be provided to the user to select the specific type of data that is desired for each column.

Figure 7:
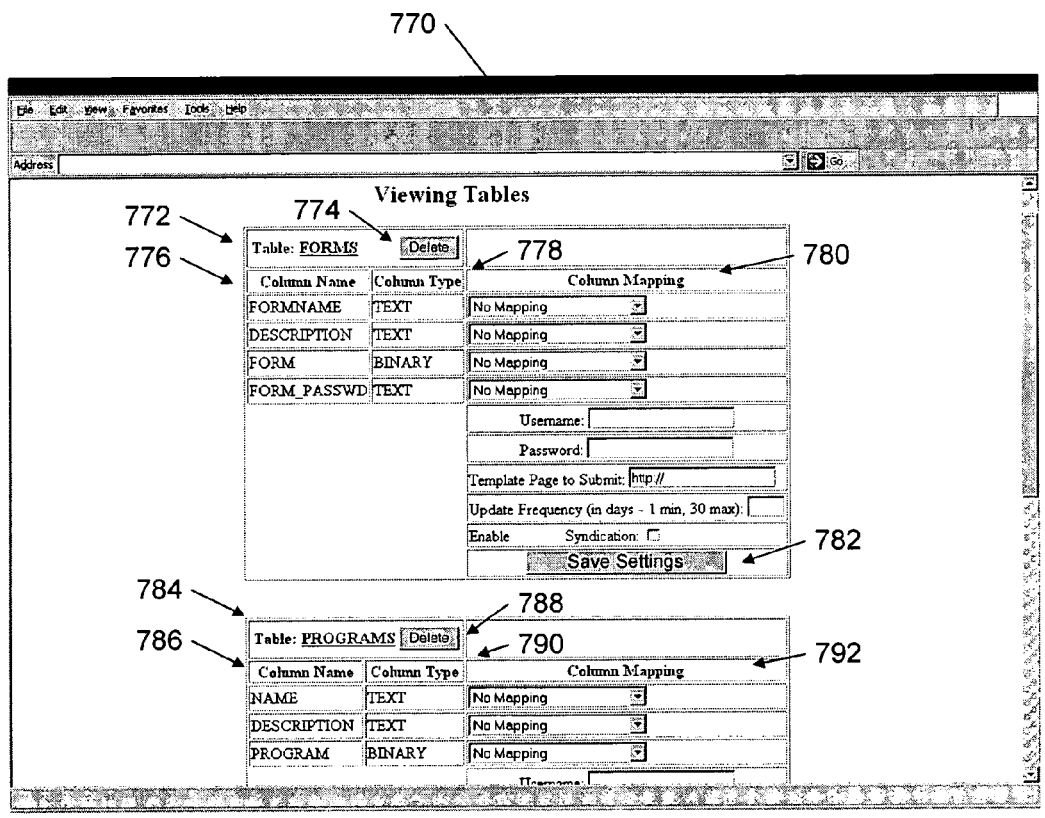
FIG. 7 is a screenshot of an exemplary dbsetup program illustrating the ability to include a plurality of tables in a single web site, similar to the dbsetup program from FIG. 6A and 6B.

FIG. 7 is a screenshot of an exemplary dbsetup program illustrating the ability to include a plurality of tables in a single web site, similar to the dbsetup program from FIGS. 6A, 6B. As illustrated, window 770 includes similar data as the window 670 from FIGS. 6A, 6B. However, in this nonlimiting example, there currently are two tables on the web site. The first table is named "FORMS," 772, and the second is named "PROGRAMS," 784. As shown, "FORMS" 772 includes four columns, with each column being designated a column type 778. "PROGRAMS" 784 includes three columns, with each column being designated a column type 790. Each table has a separate delete button 774, 788, and each table has its own column mapping parameters 780, 792. While this nonlimiting example only shows one "save settings" option 782, each column can have its own "save settings" option, however this is not a requirement.

As illustrated in FIG. 7, any number of columns can be created for a single web site or web page. Additionally, the options illustrated in FIGS. 6A, 6B, and 7 are included for purposes of illustration. Any of these options can be removed and other options can be added to fit the desired functionality.

Figure 8:
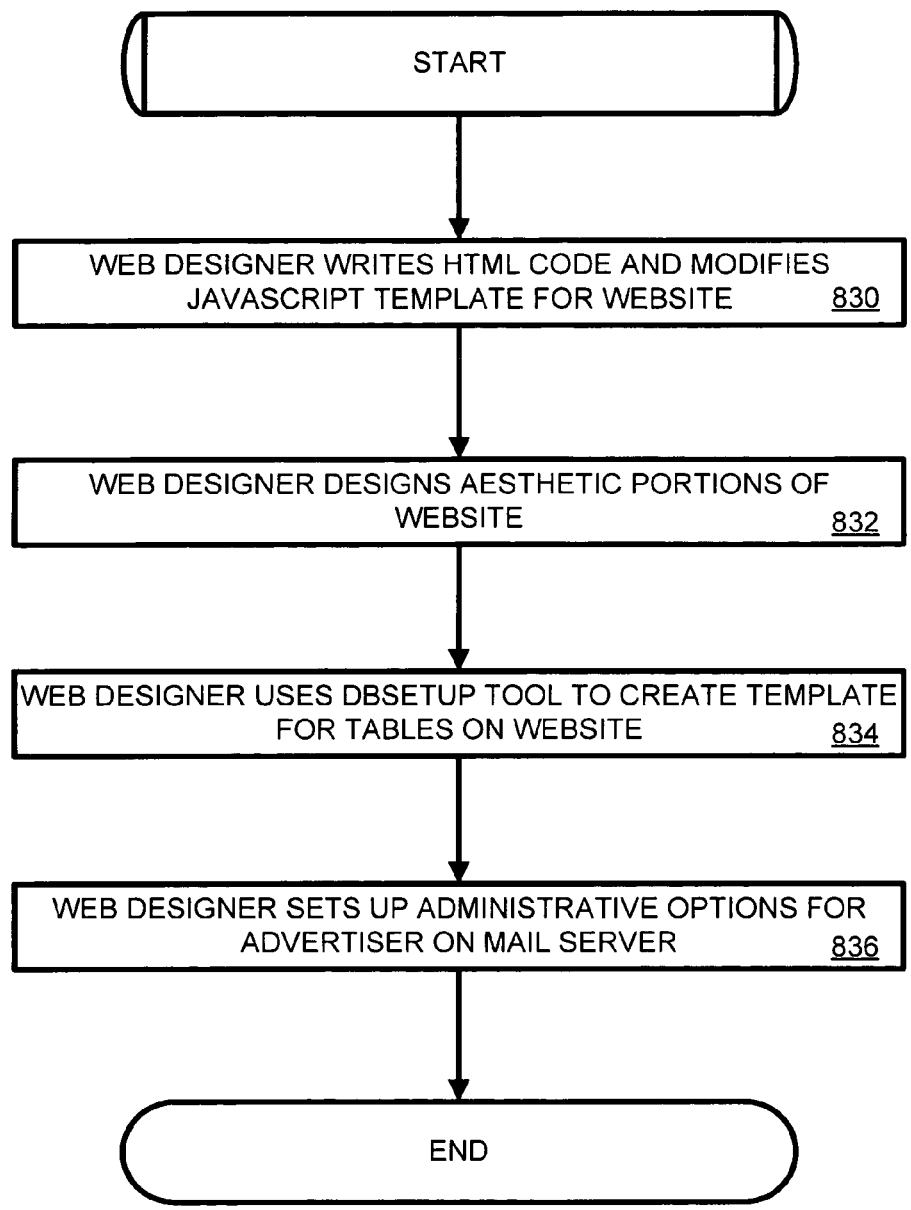
FIG. 8 is a flowchart illustrating one exemplary embodiment of steps that can be taken in providing a dynamic web site for an advertiser, such as the advertiser from FIG. 1A.

FIG. 8 is a flowchart illustrating one exemplary embodiment of steps that can be taken in providing a dynamic web site for an advertiser, such as the advertiser from FIG. 1A. As illustrated, after the designer 104 and primary contact 106 have received instructions to build a web site for an advertiser 108, the web designer 104 can write HTML code and modify the JavaScript template for the particular web site (block 830). Depending on the particular desires of the advertiser 108, some or all of the HTML code may be reused from other web sites. The web designer 104 can then design the aesthetic portions of the web site (block 832). Aesthetic portions of the web site can include configuring the location of various items on a web page, determining colors, pictures, sounds, etc. that can be presented to a web site visitor, as well as other aesthetic attributes of a web site. Additionally, the web designer can use the dbsetup tool to create the desired tables, as illustrated above (block 834). As illustrated in FIGS. 6A, 6B, and 7, the web designer 104 can create numerous tables for a single web site. The tables can vary in name, column names, size, data type, mapping options, etc. Additionally, depending on the particular implementation, the web designer 104 can also change the JavaScript to accommodate the various tables that are used in the web site.

As illustrated in FIGS. 6A, 6B, and 7, the web designer 104 can create templates for any number of tables for inclusion in the web site. Each of the tables can be independently created and each table can vary in terms of name, size, column numbers, column types, column mapping, etc. Additionally, the HTML that is associated with each table can place the tables in different positions within the web site and provide for different formatting, colors, displays, etc. As a nonlimiting example, the web designer 104 can create a table with eleven columns (or fields) and five rows (or entries). The web designer 104 can then change the JavaScript within the HTML code to display any number of those columns and rows, depending on the desires of the advertiser 108. Additionally, the web designer 104 can choose to display a portion of a table in one section of the web site and display another portion of the table in another section of the web site. As a nonlimiting example, a web designer can create a table using dbsetup. The web designer 104 can then designate that an overview of the table be displayed on a first web page. The web designer 104 can also designate that upon activation of a hyperlink attached to an element in the table, the web site can then display a more detailed view of that element. The detailed display can include entries or fields that were not displayed in the overview, allowing the web designer 104 to create custom database applications without the need of a web developer 102 or DBA 110.

Additionally, the web designer 104 can set up administrative control of the table data for the advertiser 108 on a mail server 526 (block 836). More specifically, the web designer 104 can arrange the advertiser's account such that when the advertiser 108 desires to perform administrative actions on the web site, such as changing data within the tables, the advertiser 108 can simply access the mail server 526 using a USERID and password. Once logged onto the mail server 526, the advertiser 108 can click a link to the dbupdate tool, and from there specify the table that will be changed, and the system can provide the advertiser 108 access to the dbupdate tool, discussed with reference to FIGS. 10, 11, and 12.

Figure 9:
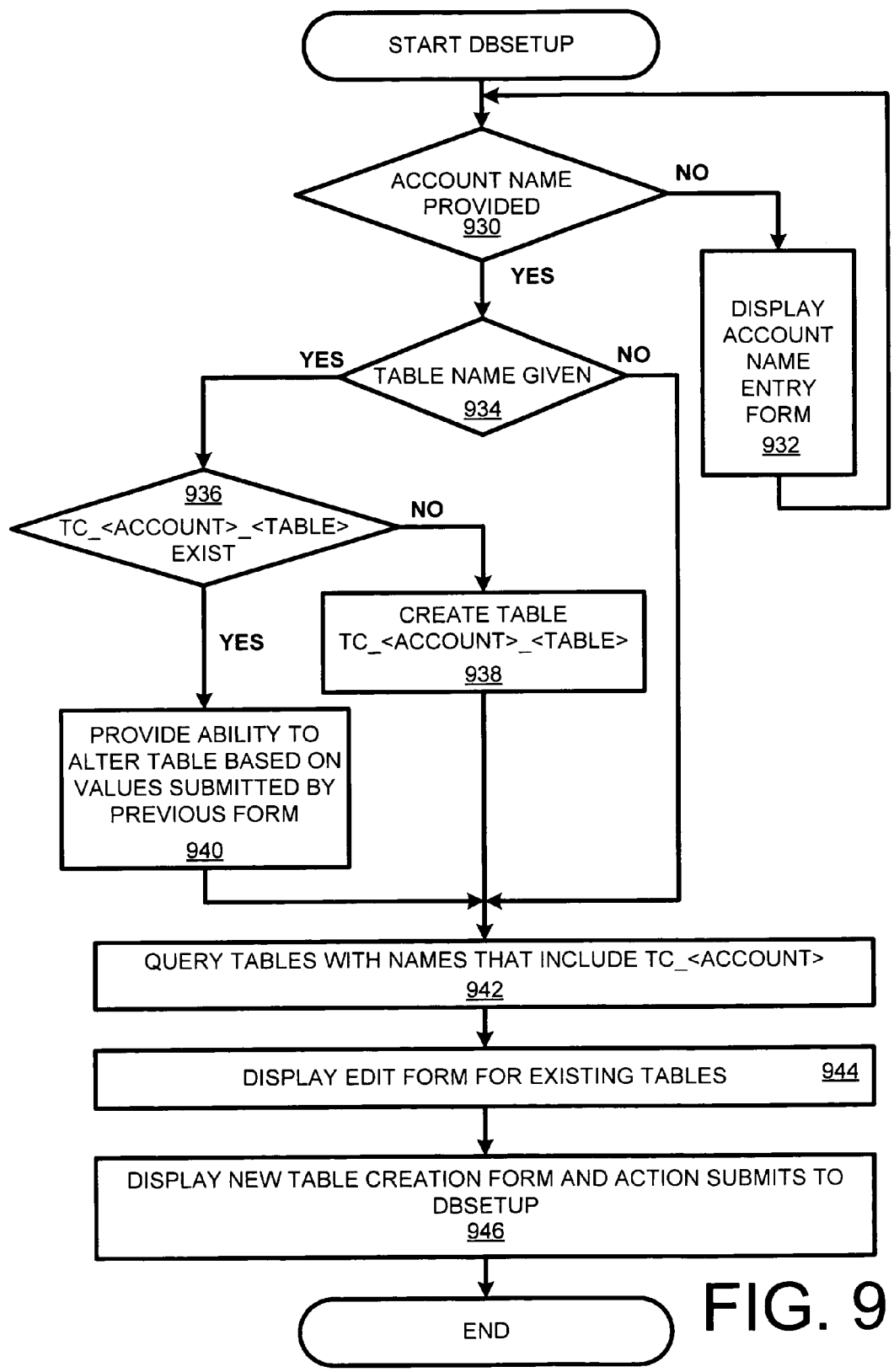
FIG. 9 is a flowchart illustrating exemplary steps that may be taken in the dbsetup program from FIGS. 6A and 6B.

FIG. 9 is a flowchart illustrating exemplary steps that may be taken in the dbsetup program from FIGS. 6A, 6B. As illustrated, the flowchart begins by determining whether an account name has been provided (block 930). If no account name has been provided, the dbsetup program can display an account name entry form to prompt the designer 104 for an account name (block 932). If an account name is provided (at block 930), the dbsetup program determines whether a table name is given (block 934). If a table name is given, the dbsetup program determines whether the table tc_<ACCOUNT>_<TABLE> exists (block 936). One should note that "tc_<ACCOUNT>_<TABLE>" is one denotation of a table that has been created for this account. As a nonlimiting example, if the account is "JOESPIZZA" and the table name is "MENU," the dbsetup program will look for the table by the name of "tc_JOESPIZZA_MENU." In block 930, the user can provide the account name "JOESPIZZA." In block 934, the user can provide the table name "MENU." The dbsetup program will then look for tc_JOESPIZZA_MENU. Depending on the account and table name, this table can be denoted differently.

If tc_<ACCOUNT>_<TABLE> exists, the dbsetup program can provide an option to alter the table based on values submitted by a previous form (block 940). More specifically, if the table already exists, the dbsetup program can display data related to the program, and the current data for that table. The designer 104, can then change the data as desired. When this is complete, the flowchart proceeds to block 942. If, on the other hand, tc_<ACCOUNT>_<TABLE> does not exist, the dbsetup program will create tc_<ACCOUNT>_<TABLE> (block 938), and the flowchart proceeds to block 942.

If, at block 934, a table name is not given, the flowchart also proceeds to block 942, and the dbsetup program can query tables with names that include tc_<ACCOUNT>. Then, dbsetup can display an edit form for existing tables with the queried account name (block 944). Dbsetup can also display a new table creation form and receive a submitted form for creation of a new table (block 946). The flowchart can then end. The steps in blocks 942, 944, and 946 can be provided to a user for allowing further updating and maintenance to tables associated with the provided account.

Figure 10:
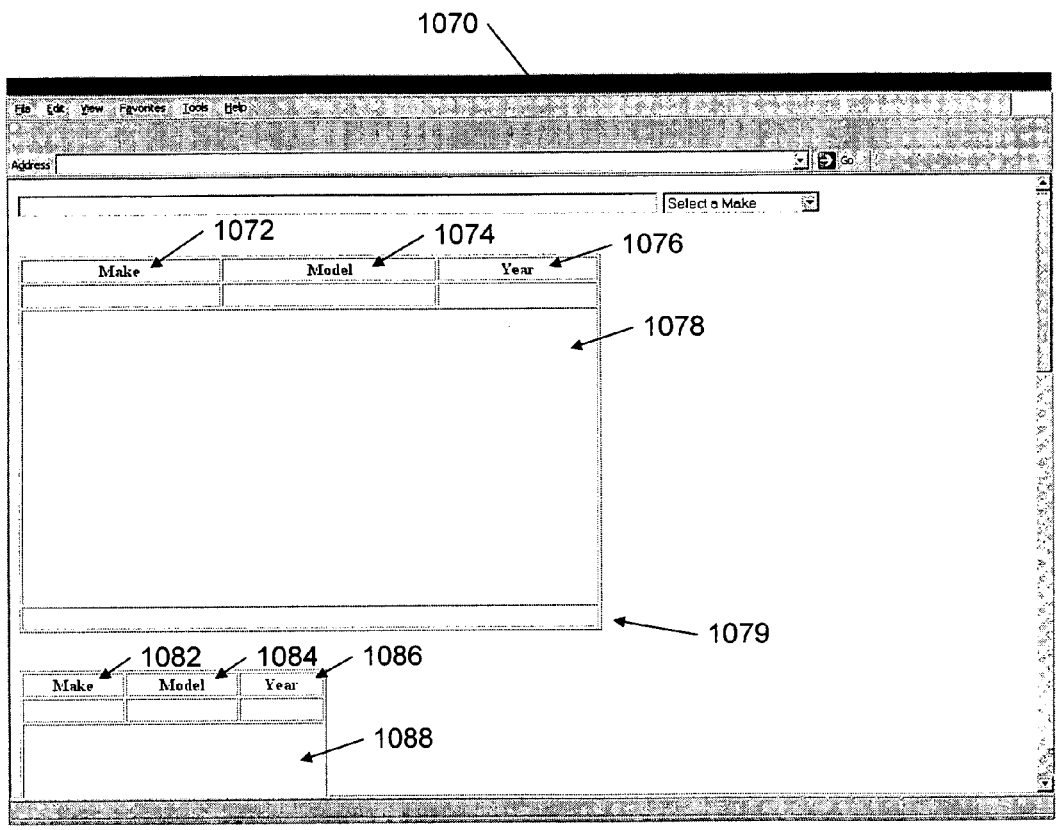
FIG. 10 is a screenshot of an exemplary template that can be used by a dbq program to display an advertiser's data into fields created in FIGS. 6A and 6B.

FIG. 10 is a screenshot of an exemplary template that can be used by a dbq program to display an advertiser's data into fields created in FIGS. 6A, 6B. As illustrated in window 1070, the columns shown in the table are separated, despite being part of the same table. The first entry of the table includes columns for make 1072, model 1074, year 1076, a picture 1078, and a description of the picture 1079. Similarly, the second entry (or row) of the table includes a make 1082, a model 1084, a year 1086, and a picture 1088. Information can be input into this table by the dbupdate program, described below. As discussed in more detail below, the first entry, corresponding to elements 1072, 1074, 1076, and 1078 can be displayed independently from the second entry, corresponding to elements 1082, 1084, 1086, and 1088.

Figure 11:
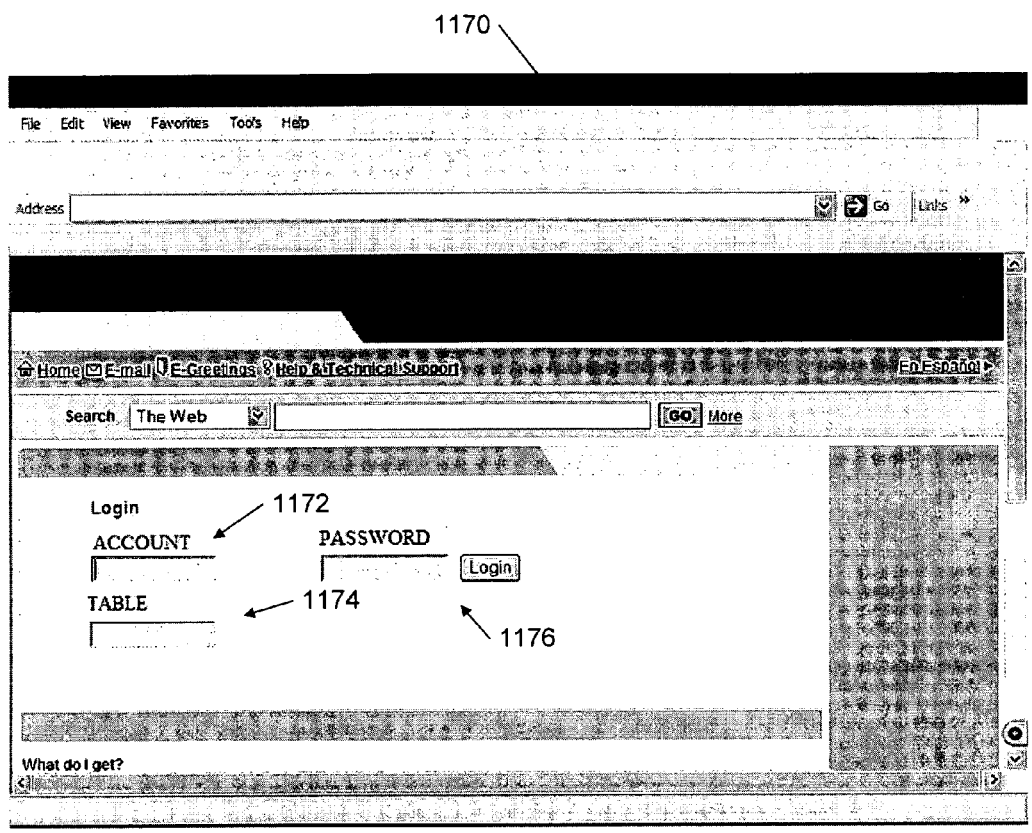
FIG. 11 is a screenshot of an exemplary login prompt for a user to edit a table created by the dbsetup program from FIGS. 6A and 6B.

FIG. 11 is a screenshot of an exemplary login prompt for a user to edit a table created by the dbsetup program from FIGS. 6A, 6B. As discussed above, in at least one embodiment, an advertiser 108 who owns a web site can manage the web site by access to the mail server 526. The advertiser 108 can logon to the mail server 526 along with the table name to access the desired information. In this nonlimiting example, window 1170 includes an account login prompt 1172, a password login prompt 1176, and a table name login prompt 1174. These prompts can allow an advertiser 108 to enter data for his or her web site. This data can be presented in a format that allows the advertiser 108 to make easy changes without contacting the ISP and incurring extra charges for management of the web site. While this nonlimiting example discusses an advertiser 108 logging onto a mail server 526, one should note that this is but a nonlimiting example. More specifically, other embodiments may allow a user to simply access a web site to manage the account. Access to the mail server 526 may or may not be desired. Additionally, other ways of providing an advertiser 108 with access to administrative functions are also included herein.

Figure 12:
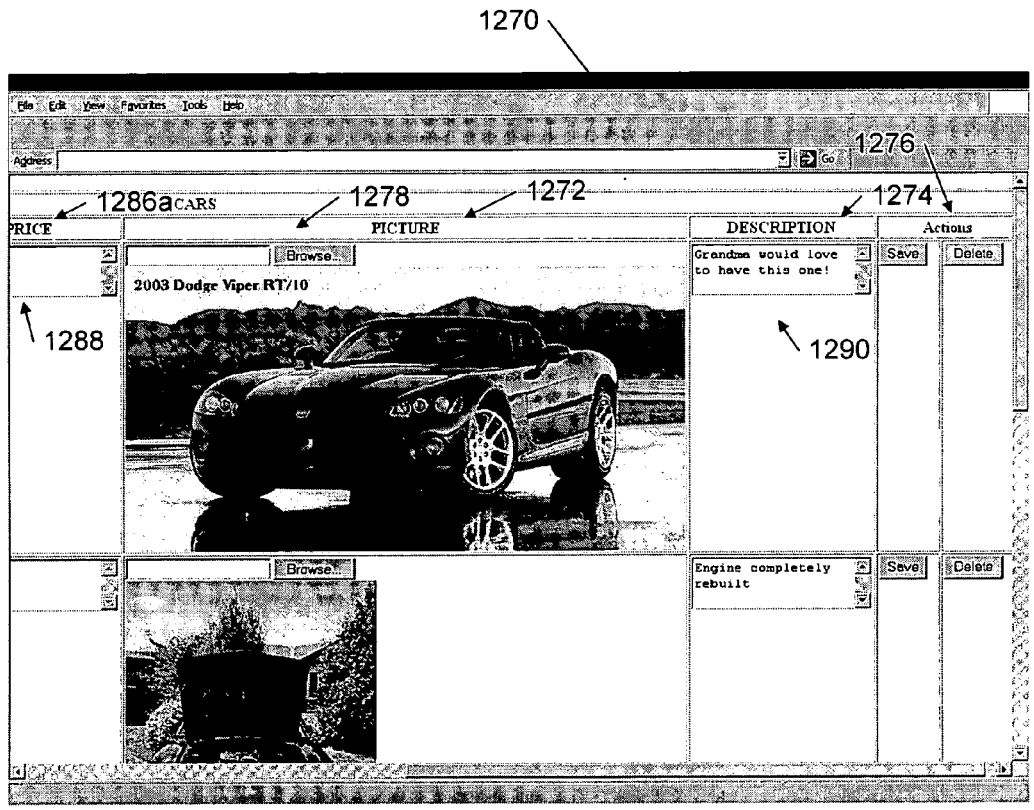
FIG. 12 is a screenshot of an exemplary dbupdate screen for adding and editing data on a table created by the dbsetup program from FIGS. 6A and 6B.

FIG. 12 is a screenshot for adding and editing data on an exemplary table created by the dbsetup program from FIGS. 6A, 6B. More specifically, window 1270 illustrates a display for a dbupdate program. The columns displayed from this screen are defined from the dbsetup program (FIGS. 6A, 6B). Similar to window 1070 from FIG. 10, the dbupdate display includes a column for price 1286a and a text area for the advertiser 108 to enter the desired price 1288. Additionally, a picture display 1272 is provided, which can be uploaded from the advertiser's user device 208. The advertiser 108 can enter the file path directly, or use the browse function as illustrated with 1278. Additionally, a column for a description 1274 is provided, as well as a text area 1290 for the advertiser to enter a description. Similarly, with the second entry in the table, there are also columns for price, picture, and description. There is also an "Actions" column 1276 (which is generally not a part of the data in the table) that allows the user to save or delete an entry or even the entire table.

Figure 13:
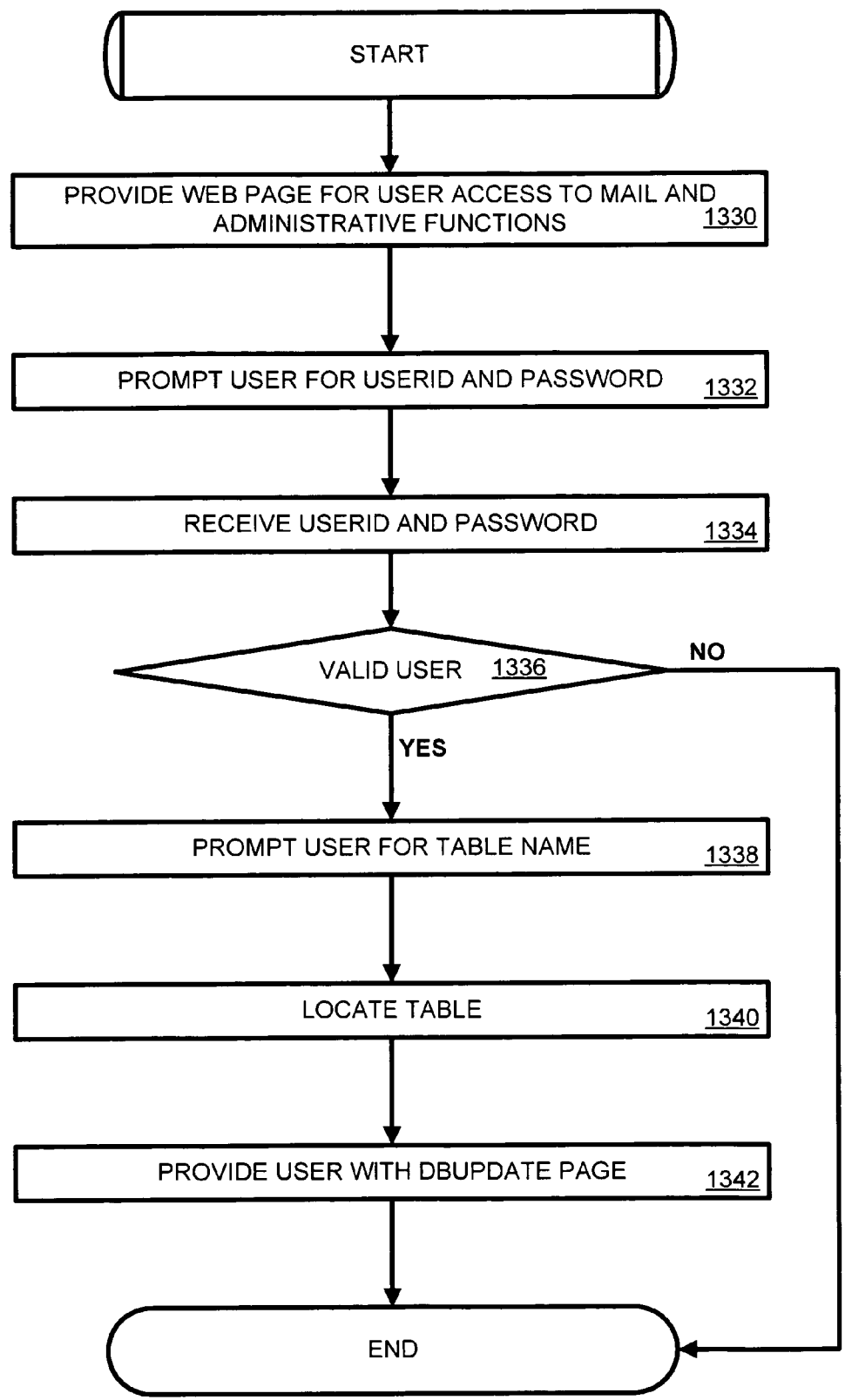
FIG. 13 is a flowchart of exemplary steps that may be taken to provide an advertiser administrative access to the dbupdate program from FIG. 12.

FIG. 13 is a flowchart of exemplary steps that may be taken to provide an advertiser administrative access to the dbupdate program of FIG. 12. As illustrated, the first step in this nonlimiting example is to provide a web page for a user to access mail and administrative functions (block 1330). As discussed above, the user can be an advertiser 108 who wants to access his or her account. Also as discussed above, while this nonlimiting example relates the administrative function to a mail server 526, this disclosure is not intended to be so limiting.

The next step is to prompt the user for a USERID and password (block 1332). This may take many forms, including a traditional prompt to enter a sequence of alphanumeric characters for the USERID and password. However, other authentication may be used as well, including but not limited to biometrics. After the user is prompted, the system can receive the user authentication information (block 1334) and determine whether the user is valid (i.e., does the user have a valid account with the system—block 1336). If the user is not valid, the process ends. However, if the system finds the user to be valid, the system can prompt the user for a table name (block 1338). One should note that depending on the particular embodiment, the user can also be prompted for an account name, however, this may have been implicitly received by receiving the user's USERID and password. Once the user has entered the table name, the system can locate the desired table (block 1340) and provide the user with the dbupdate page associated with that table (block 1342).

Figure 14A:
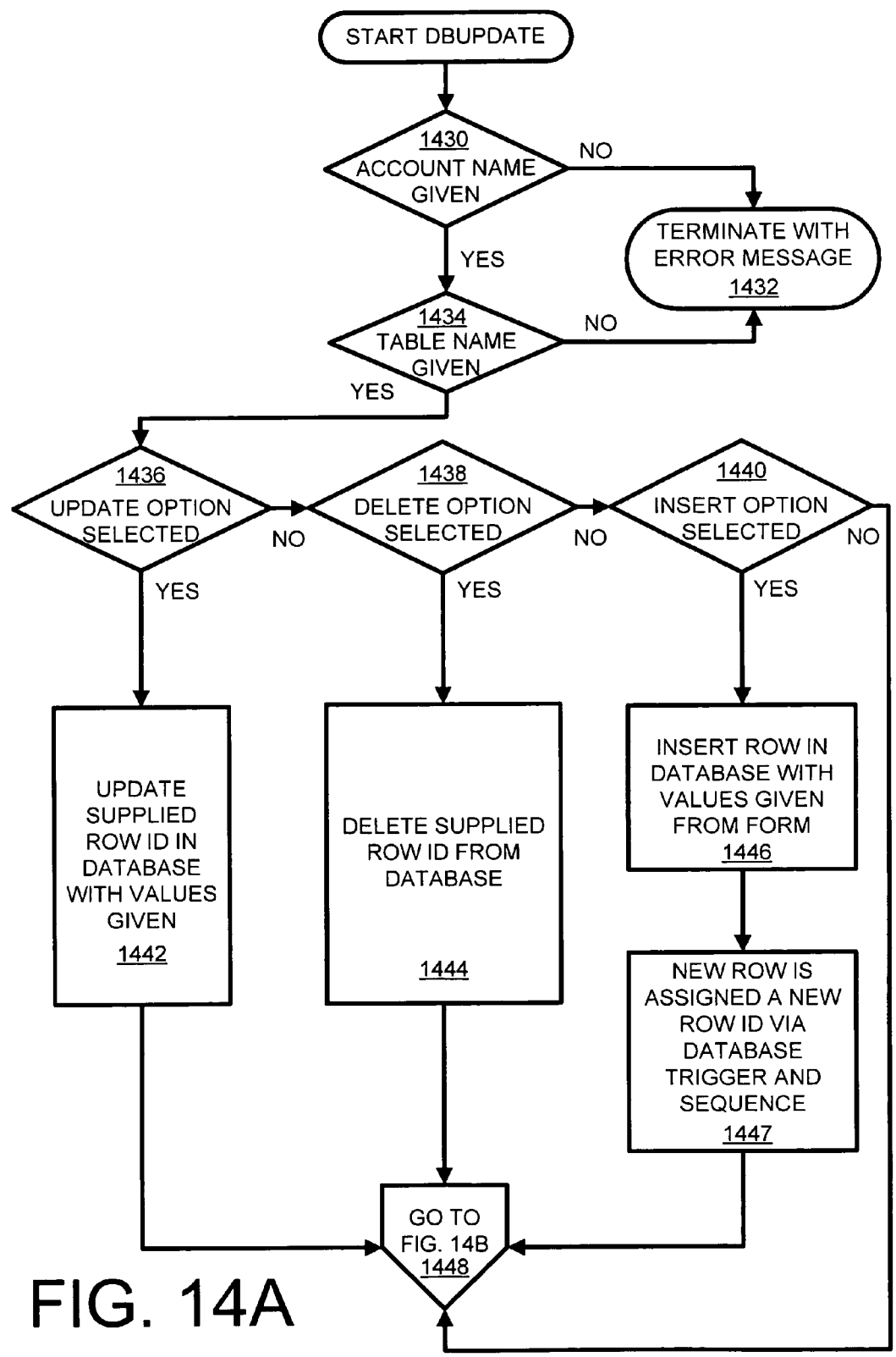
FIG. 14A is a flowchart illustrating exemplary steps that may be taken in the dbupdate program from FIG. 12.

FIG. 14A is a flowchart illustrating exemplary steps that may be taken in the dbupdate program from FIG. 12. As illustrated, a determination can be made as to whether an account name is given (block 1430). If an account name is not given, the dbupdate program can terminate with an error message (block 1432). If an account name is given, the dbupdate program can determine whether a table name is given (block 1434). If a table name is not given, the dbupdate program can terminate with an error message (block 1432).

If a table name is given, a determination can be made as to whether an update option has been selected (block 1436). If an update option has been selected, the dbupdate program can update one or more supplied row ID in the database logic with values given (block 1442). The flowchart then proceeds to jump block 1448. If, on the other hand, the update option is not selected, a determination can be made as to whether a delete option is selected (block 1438). If a delete option is selected, the dbupdate program can delete the supplied one or more row ID from the database logic (block 1444). The flowchart can then proceed to jump block 1448. If the delete option is not selected, a determination can be made as to whether an insert option has been selected (block 1440). If the insert option is selected, the dbupdate program can insert a row in the database logic with values given by the user (block 1446). The new row is assigned a new row ID via a database trigger and sequence (block 1447). If the insert option is not selected, the flowchart proceeds to block 1448, which is continued in FIG. 14B.

Figure 14B:
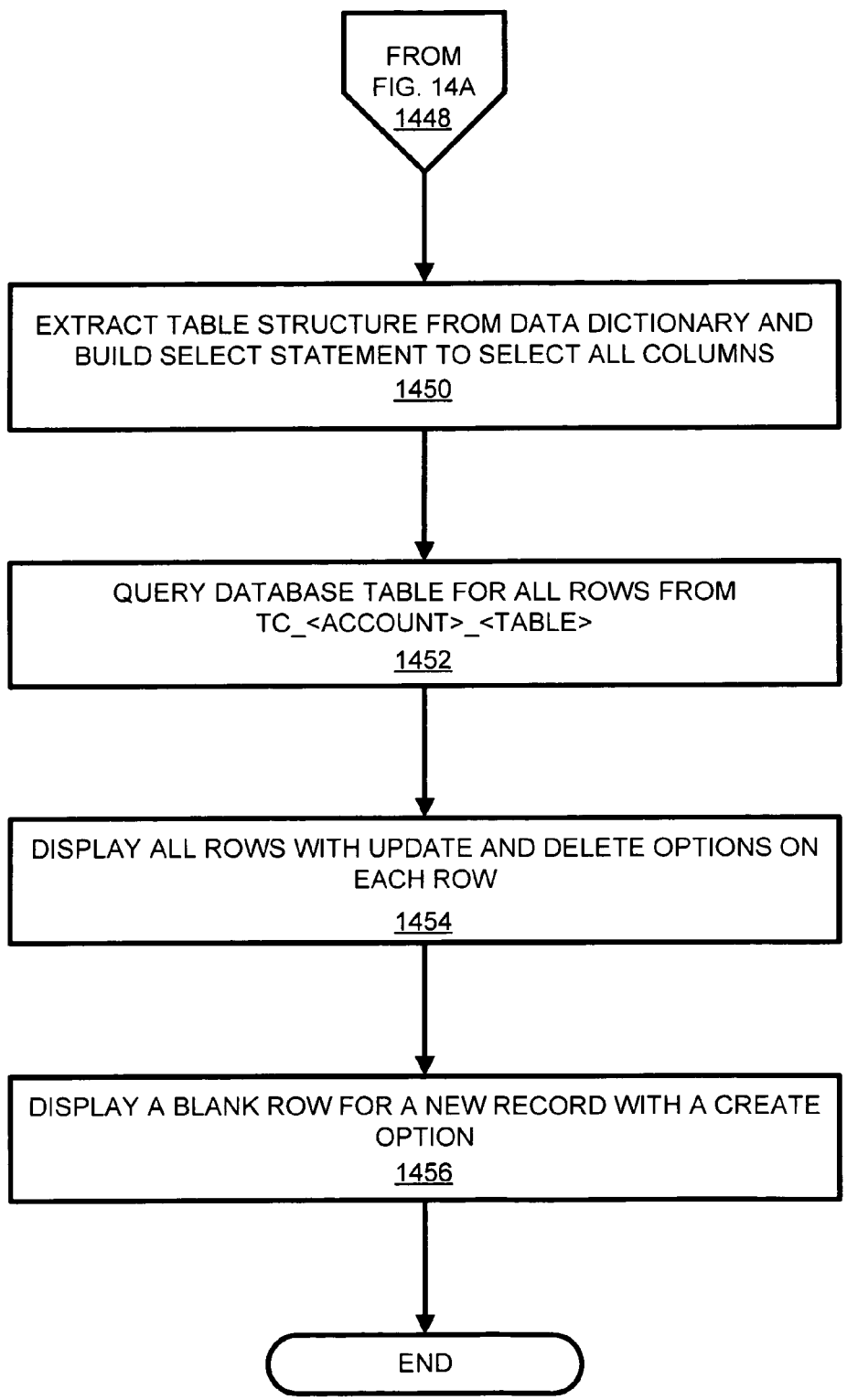
FIG. 14B is a continuation of the flowchart from FIG. 14A.

FIG. 14B is a continuation of the flowchart from FIG. 14A. As illustrated in FIG. 14B, from jump block 1448, the flowchart proceeds to extract the table structure from a data dictionary and build a select statement to select all columns (block 1450). Then the dbupdate program can query the database table for all rows from the tc_<ACCOUNT>_<TABLE> (block 1452). The dbupdate program can display all rows with update and delete options on each row (block 1454). Additionally, the dbupdate program can display a blank row for a new record with a create option (block 1456).

Figure 15:
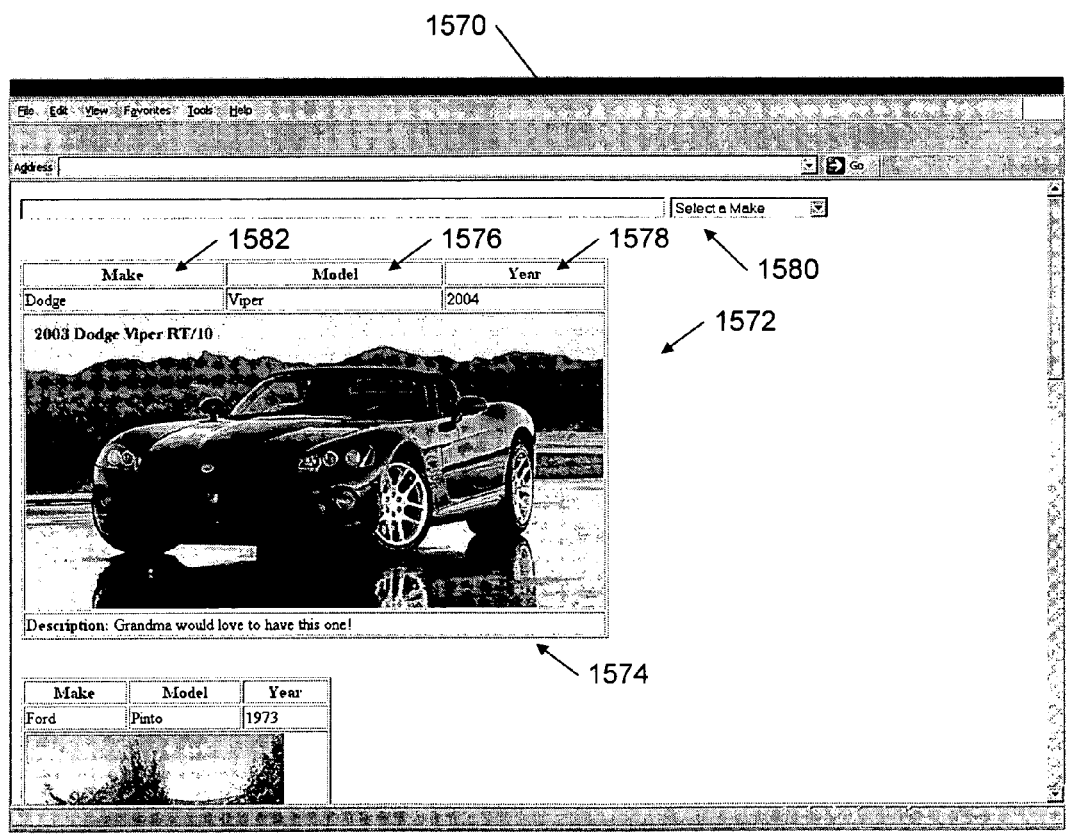
FIG. 15 is a screenshot of an exemplary table with data inserted via dbq program, using a template such as the template from FIG. 10 and data from FIG. 12.

FIG. 15 is a screenshot of an exemplary table with data inserted via dbq program, using a template such as the template from FIG. 10 and data from FIG. 12. As illustrated, in FIG. 12, FIG. 15 includes a "make" column 1582, a "model" column 1576, a "year" column 1578, a "picture" column 1572, and a "description" column 1574. In the first row of the table, the make is a Dodge, the model is a Viper, the year is 2004, the picture is a photograph of a Dodge Viper, and the description states "Grandma would love to have this one!" For the second entry of the table illustrated in this nonlimiting example, the make is a Ford, the model is a Pinto, and the year is 1973. Other data in the table is not shown.

In at least one nonlimiting example, the web page illustrated in FIG. 15 is a web page that a user can access via any web portal. The data can be provided by a dbq program (discussed below) and can be updated by the dbupdate program, discussed above. Additionally, at least one embodiment may also provide an advertiser 108 secure access to this page for previewing purposes, without publishing the web page on the Internet. In such an embodiment, the advertiser 108 can amend various portions of the data by using dbupdate. In order to check for errors and other undesirable items, the user may view this secure page. After the advertiser approves the page, the page may be published over the Internet.

Figure 16:
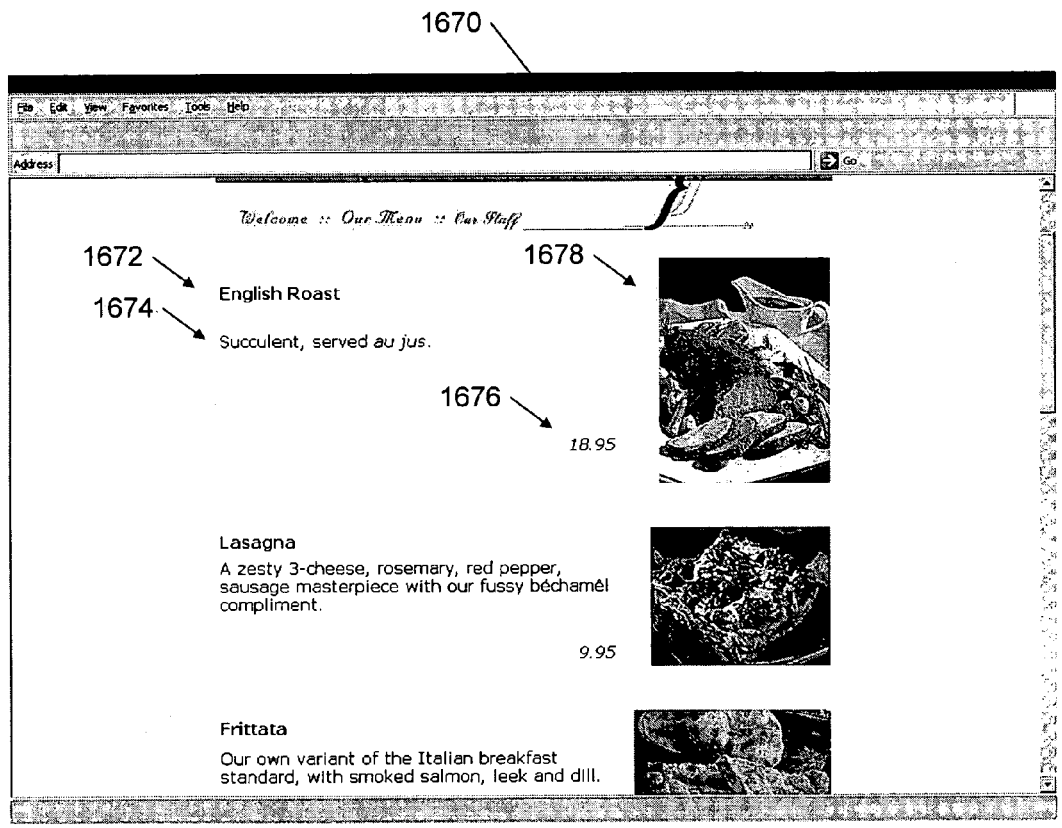
FIG. 16 is a screenshot of an exemplary table with data inserted, further illustrating the ability to customize the data presentation, similar to the screenshot from FIG. 15.

FIG. 16 is a screenshot of an exemplary table with data inserted, further illustrating the ability to customize the data presentation, similar to the screenshot from FIG. 15. As illustrated in window 1670, the table data displayed does not need to conform to a specific format or presentation style. Boarders can be removed, and each piece of data can be arranged independently. More specifically, in this nonlimiting example, the "Dish" column 1672 (whose column name is not displayed) is displayed with three entries: English Roast, Lasagna, and Frittata. The spacing between the entries can be defined by the designer 104. Similarly, the description column 1674 can include a description for each entry, however this is not a requirement. As with the other columns, the price column 1676 can be arranged on the web page according to a designer's specifications, but as illustrated in window 1670, the columns need not be situated adjacent to one another. Finally, in this nonlimiting example is a picture column 1678, which displays a picture associated with the dish.

Additionally in this nonlimiting example, the data in the tables need not conform to any particular arrangement. Each piece of data associated with each entry can be arranged in any manner that the advertiser desires. Similarly, table boarders are not necessary, and different font formatting may be applied for each entry and data related to each entry.

Figure 17:
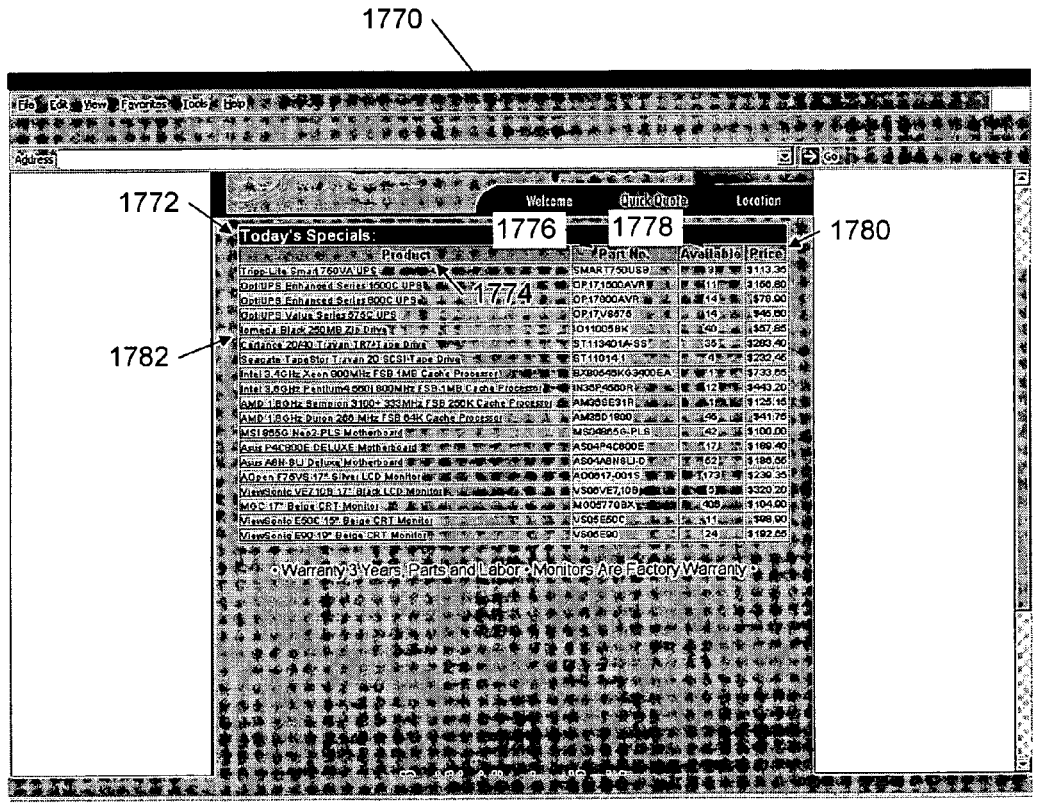
FIG. 17 is a screenshot of an exemplary table with data inserted, further illustrating the ability to display a portion of the data available, similar to the screenshot from FIG. 15.

FIG. 17 is a screenshot of an exemplary table with data inserted, further illustrating the ability to display a portion of the data available, similar to the screenshot from FIG. 15. In this nonlimiting example, the table "Today's Specials" 1772 includes at least four columns and 20 entries. The columns displayed in window 1770 include a "Product" column 1774, a "Part No." column 1776, an "Available" column 1778, and a "price" column 1780. As also illustrated in this nonlimiting example, each entry can also include a hyperlink to more detailed information that may be present in the table for display on another web page. In this nonlimiting embodiment the entries under the "Product" column are associated with hyperlinks to a more detailed view of the item selected. One should note that any of the data can be associated with a hyperlink to another view of the table data, depending on the particular desires of the advertiser.

Figure 18:
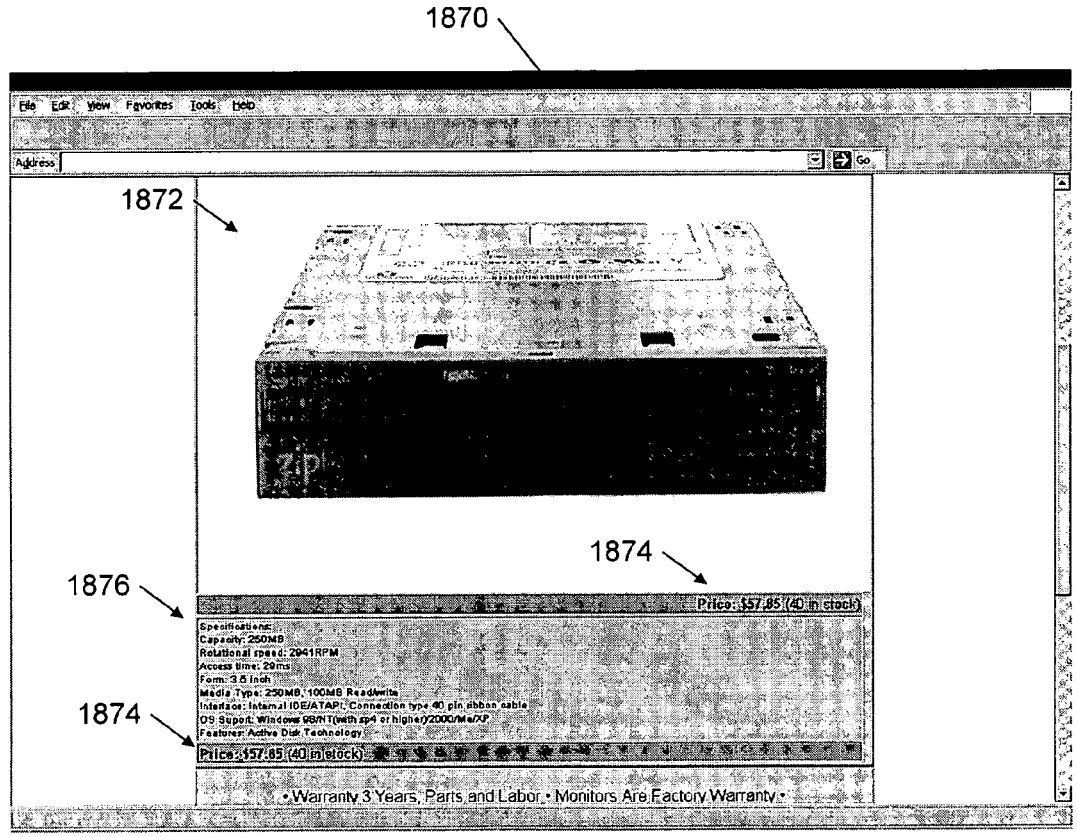
FIG. 18 is a screenshot of an exemplary table entry that may be accessed via the table from FIG. 17.

FIG. 18 is a screenshot of an exemplary table entry that may be accessed via the table from FIG. 17. As illustrated in window 1870, more detailed information related to a selected entry (1782 from FIG. 17) can be displayed. More specifically, the table displayed in FIG. 17 shows only four columns, despite the fact that more columns may be present in that table. As illustrated in FIG. 18, the table also includes columns for capacity, rotational speed, access time, form, media type, interface, OS support, and features 1876. Additionally present in the table is a picture of the selected item 1872. One should also note that information displayed in window 1770 can also be displayed in window 1870, such as price column for this entry 1874.

Figure 19:
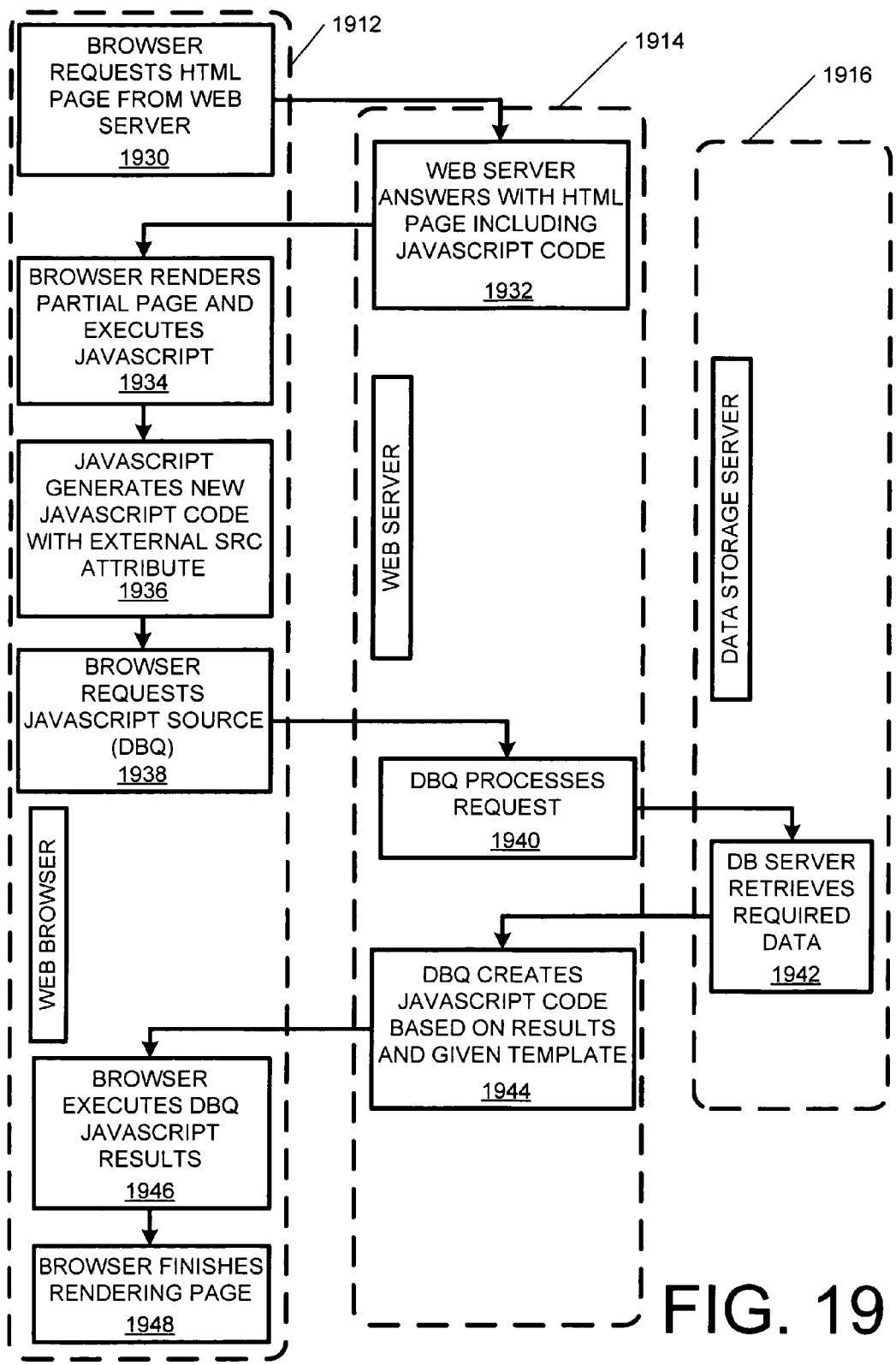
FIG. 19 is a functional flowchart illustrating exemplary steps that may be taken in execution of a dbq program to present a web site to the end-user from FIG. 2A.

FIG. 19 is an exemplary functional flowchart illustrating exemplary steps that may be taken in execution of a dbq program to present a web site to the end-user from FIG. 2A. As illustrated, an end-user's browser 1912 can request an HTML page from a web server 1914 (block 1930). The web server 1914 can answer the request with an HTML page including JavaScript code (block 1932). The browser 1912 renders a portion of the page and executes the JavaScript (block 1934). The JavaScript generates new JavaScript code with an external "src" attribute (block 1936), which includes a path to dbq that can include the following parameters: formatting template, account name, table, etc. The template information created by designer 104 can include all formatting and HTML code desired to display data that is to be retrieved by the dbq program. The browser 1912 can request the dbq CGI (block 1938). The dbq program can be located on a web server 1914, and can process the request (block 1940). In this nonlimiting example, the dbq program is on the web server, however in other embodiments, the dbq program can reside on an application server (not shown in FIG. 19). The dbq program can request that the data storage server retrieve the desired data (block 1942). The dbq program can then create JavaScript code based on results and the given template (block 1944), which can instruct the web browser or user device how to render the data, as well as what data to display. The browser 1912 executes the dbq created JavaScript results (block 1946). This can permit the browser 1912 to finish rendering the web page (block 1948), thereby allowing the browser 1912 to display the correctly-formatted data retrieved by the dbq program. This step can be performed by using a JavaScript function "document.write( )".

One should note that this configuration, as opposed to the configuration from FIG. 4 allows for an advertiser 108 to manage the data on the web site. More specifically, the dbupdate program can update information that is stored on the data storage server (or data storage logic 520 from FIG. 5A). The dbq program can then retrieve the updated information and facilitate rendering the web page. In contrast, the configuration from FIG. 4 designates that the CGI program render the web page. In order to update information on the web page, the CGI can be amended. As the CGI can include computer code, changing the data can be difficult for the end-user to adequately complete. In addition, using a method, such as the method from FIG. 4 can implement the services of a developer and a DBA, whereas methods discussed in this exemplary embodiment can be performed without a developer or DBA (or both). By implementing dbsetup, the designer 104 can create the tables for the web site. Using dbq, the designer 104 can customize the behavior of a CGI, thus allowing the designer the ability to completely build the web site from the ground up. This capability can eliminate unnecessary costs, hours, and additional staff.

Figure 20A:
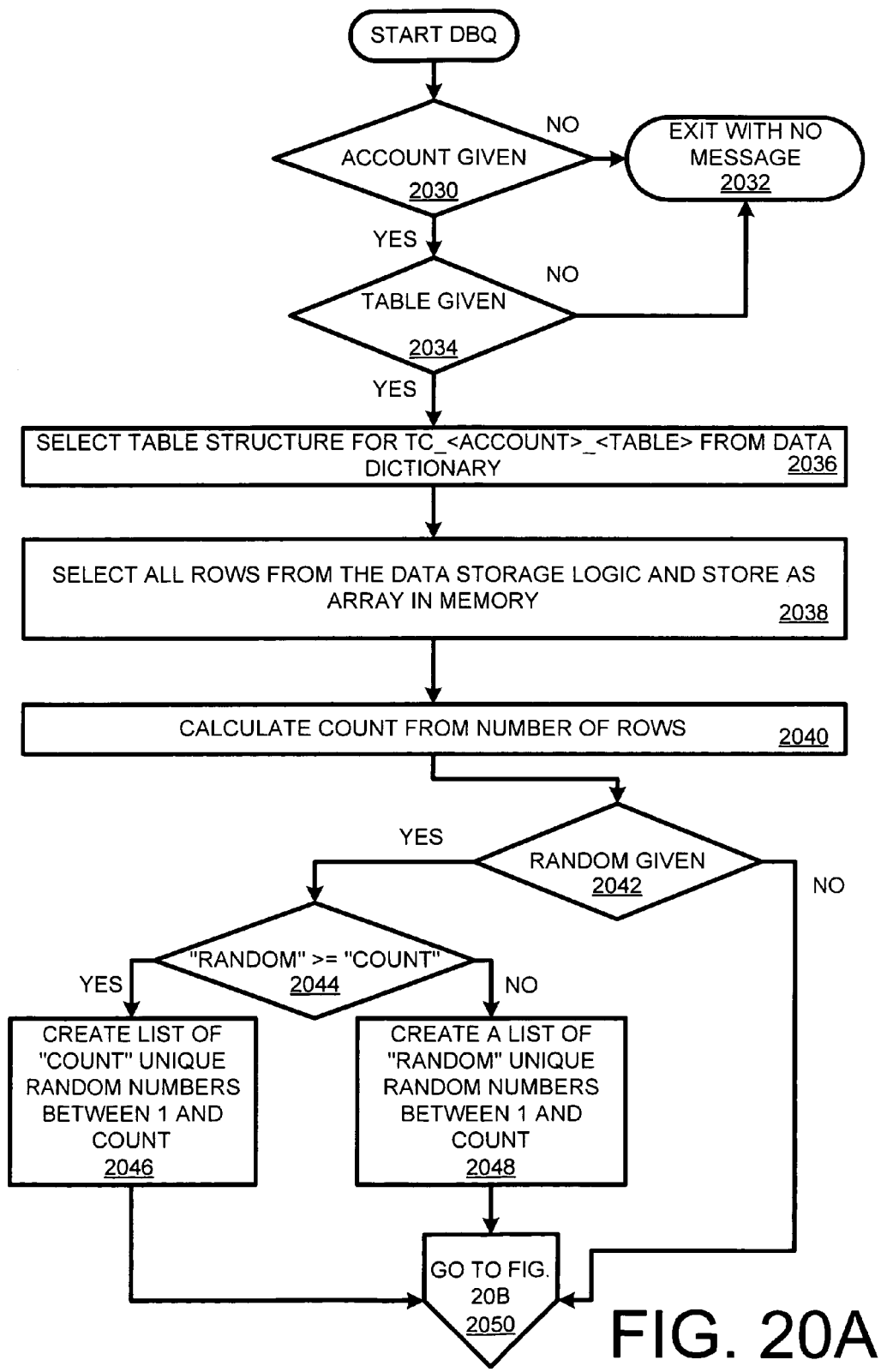
FIG. 20A is a flowchart illustrating exemplary steps that may be taken in execution of a dbq program to present a web site to the end user from FIG. 2A.

FIG. 20A is a flowchart illustrating exemplary steps that may be taken in execution of a dbq program to present a web site to the end user from FIG. 2A. As illustrated in FIG. 20A, the dbq program can determine if an account has been given (block 2030). If an account has not been given, the dbq program can exit with no message (block 2032). If an account is given, the dbq program can determine whether a table is given (block 2034). If no table is given, the dbq program can exit with no message (block 2032). If a table is given, the dbq program can select a table structure for tc_<ACCOUNT>_<TABLE> from a data dictionary (block 2036). The dbq program can then select all rows from the data storage logic and store as an array in memory (block 2038). Other embodiments can include dbq specifying a particular field value. If given, only fields having the specified value will be shown (e.g., Part_Number=123 can return part #123; MAKE=ford will return only fords). The dbq program can calculate "count" from the number of rows in the table (block 2040). Count can specifically be set to the number of rows returned from the query, based on the parameters given to the dbq program. A determination can then be made as to whether a "random" value is given (block 2042). "Random" is an optional argument given to the dbq program that can specify how many random rows to return from the database. If "random" is not given, the flowchart proceeds to jump block 2050. If a "random" value is given, a determination can be made as to whether the "random" value is greater or equal to the value for "count" (i.e., whether "random" has asked for more rows than are in the table—block 2044). If "random" is greater than or equal to the number of rows in "count," then the dbq program creates a list of "count" unique random numbers between 1 and "count" (block 2046). In other words, the dbq program can create a list of row numbers that is randomly selected from a result set, effectively re-sequencing the entire result set in random order. The flowchart then proceeds to jump block 2050. If instead "random" is not greater than or equal to "count," the dbq program can create a list of "random" unique numbers between 1 and "count" (block 2048). In other words, the dbq program can take the number defined in "random" and randomly select and take "random" number of rows from the entire result set. Dbq can then create a list based on these row numbers. The flowchart then proceeds to jump block 2050.

For purposes of illustration, referring back to FIG. 17, one can assume that there are 20 entries (rows) in the table. "Count" would therefore equal 20. The dpq program could then search the code to determine whether there is a random command and a "random" value given. If there is a random command and a "random" value given, the dbq program can determine whether the "random" value is greater than or equal to 20 ("count"). If "random" is greater or equal to 20, then the dbq program creates a list of 20 unique random numbers between 1 and 20. If, on the other hand, "random" is less than 20, (as a nonlimiting example, "random" equals 19) the dbq program can create a list of 19 unique random numbers between 1 and 20. If no "random" value is given (block 2042), the flowchart proceeds to jump block 2050.

Figure 20B:
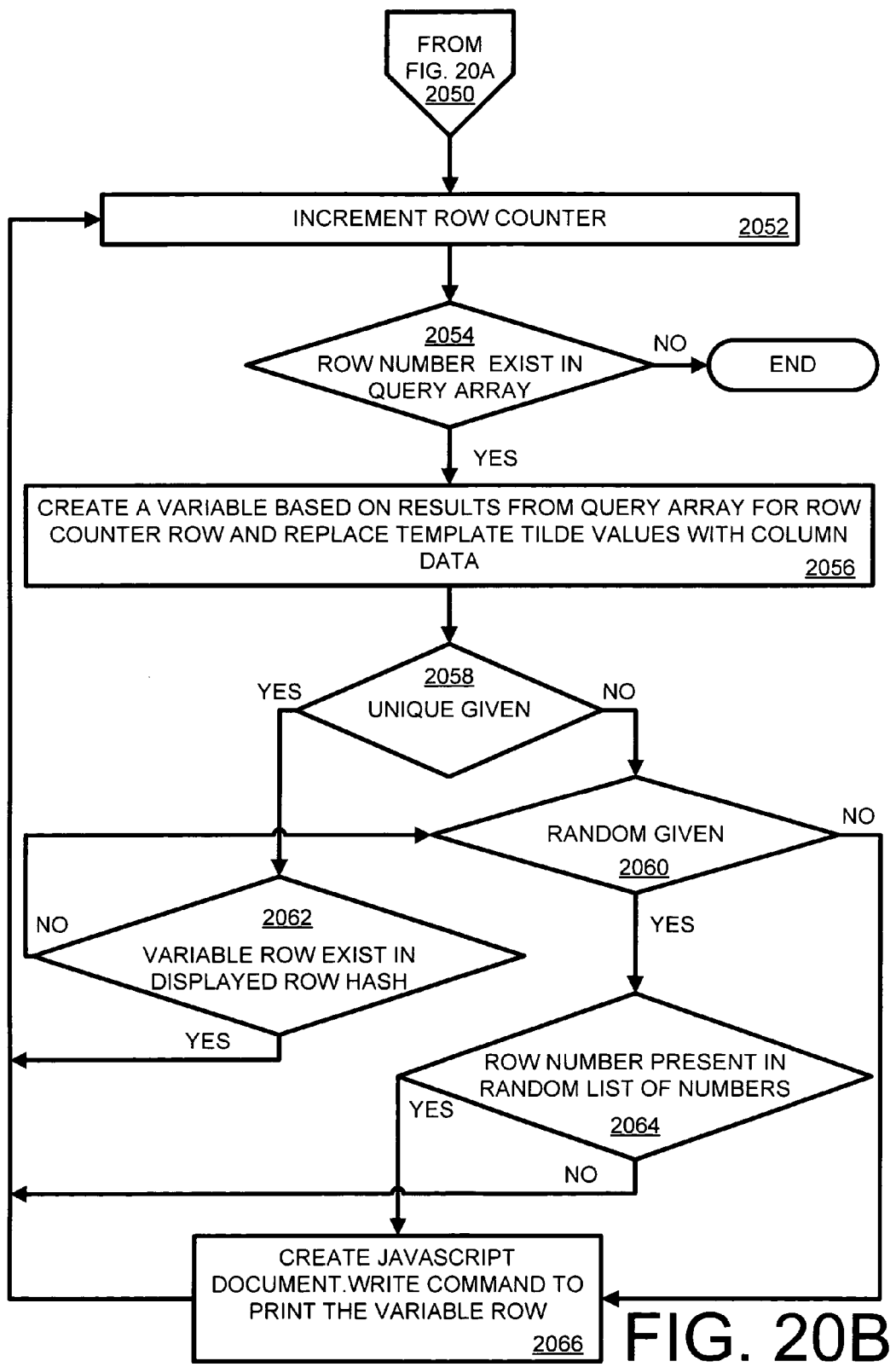
FIG. 20B is a continuation of the flowchart from FIG. 20A.

FIG. 20B is a continuation of the flowchart from FIG. 20A. As illustrated, jump block 2050 proceeds to increment the row counter (block 2052). The dbq program can then determine whether a row number exists in the query array (2054). A row counter points to a particular row ID within the query result set (query array) itself. If the row counter does not exist in the query array, there is no data left to process, and the flowchart ends. If, however, the row counter does exist in the query array, the dbq program can create a variable based on results from the query array for a row counter and replace the template tilde values with column data (block 2056) for that particular row. The dbq program can then determine whether a "unique" value is given (block 2058). If a "unique" value is not given, the flowchart proceeds to block 2060. However, if a "unique" value is given, the dbq program can determine whether a variable row exists in the displayed row hash (block 2062). The display row hash can use a key of the entire template line with the variables substituted. This allows the dbq program to determine if the line is unique within the output. In programmatic terms, a hash is an array in memory whose key element is a textual field. If a variable row exists in the displayed row hash (i.e., that particular data element has been seen, and therefore not unique), the flowchart returns to block 2052 to increment the row counter. If, on the other hand, a variable row does not exist in the displayed row hash (and therefore is unique), the dbq program determines whether a "random" value was given (block 2060). If a "random" value is not given, the flowchart proceeds to block 2066. If a random number is given, the dbq program can determine whether a row number is present in the random list of numbers (block 2064). If a row number is not present in the random list of numbers, the row counter can be incremented (block 2052). If, however a row number is present in the random list of numbers the dbq program can create a JavaScript "document-.write" command to print the variable row based on the template (block 2066, see also description with reference to FIGS. 26A, 26B, 26C, and 26D). The program can continue to run, looping over the query array until the row number exceeds the number of rows returned in the query.

Figure 21:
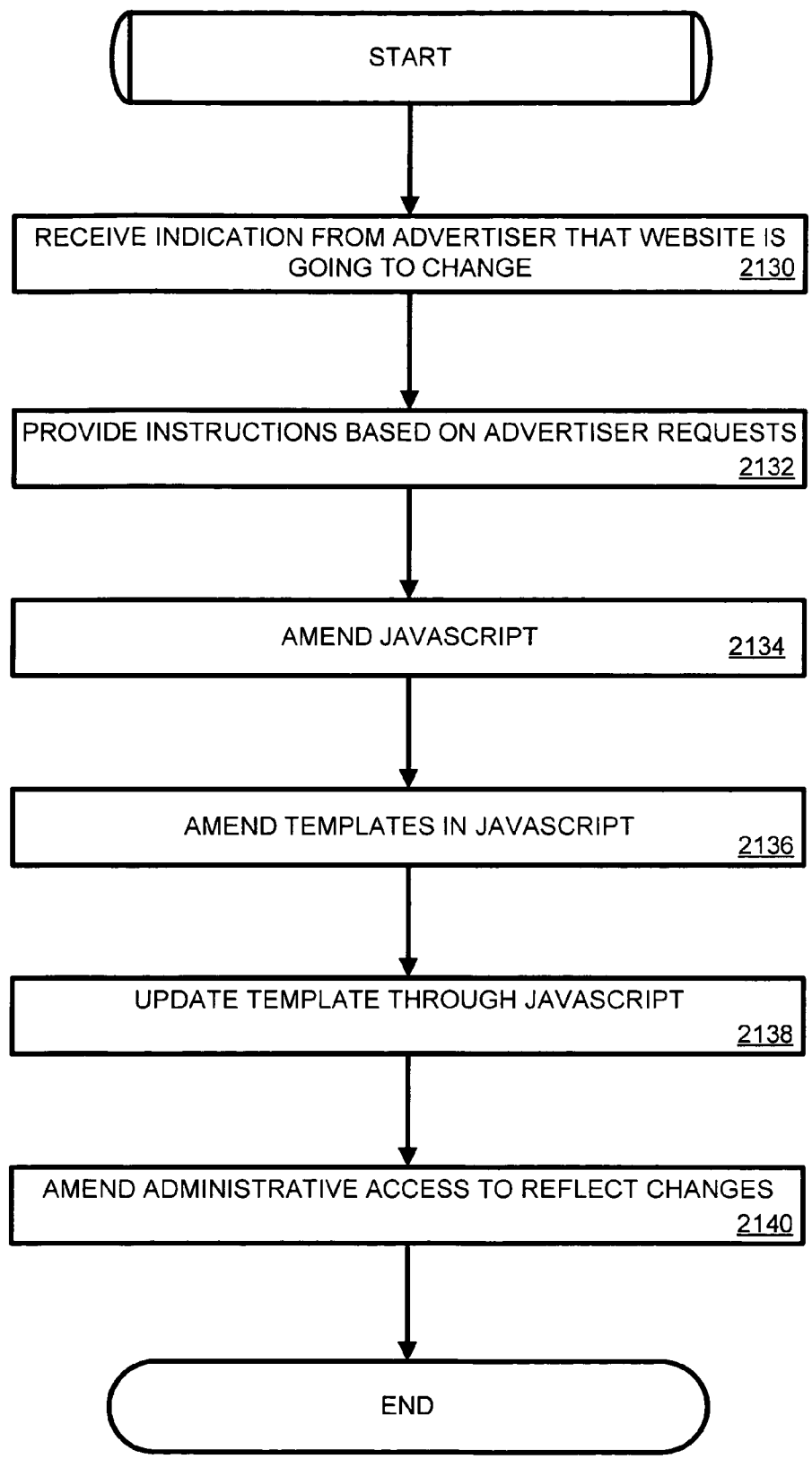
FIG. 21 is a flowchart illustrating exemplary steps that may be taken to provide more extensive changes to an advertiser's web site that can be created with the dbsetup program from FIGS. 6A and 6B.

FIG. 21 is a flowchart illustrating exemplary steps that may be taken to provide more extensive changes to an advertiser's web site that can be created with the dbsetup program from FIGS. 6A, 6B. As illustrated, a first step in this nonlimiting example is that the system receives indication from the advertiser that the web site is going to change (block 2130). More specifically, the advertiser desires a change to the web site that is better suited with access to the HTML code. Such a change might include changing colors on the web site, adding web pages to the web site, repositioning data on the web site, etc.

Once the indication is received, the system can provide instructions regarding the changes to be made (block 2132). With reference to FIG. 1A, this can occur by the primary contact instructing the web designer of the desired changes. Other embodiments can include an automated system configured to communicate instructions based on the desired advertiser changes.

Next, the JavaScript is amended to facilitate the new changes (block 2134). As a nonlimiting example, if the advertiser 108 indicates that a new table is included on a new page within the web site, a web designer 104 can add new HTML to facilitate this change. Additionally, reference to the new table can be added to the JavaScript (or new JavaScript can be added to facilitate the change). Once the JavaScript is amended, the templates can be amended in JavaScript (block 2136). With reference to FIGS. 6A and 6B, the designer 104 can add a new table with the desired functionality. After the templates are amended, the templates can be updated through JavaScript (block 2138). One should note that in some embodiments a designer 104 or an advertiser 108 can perform this step. More specifically, the advertiser 108 may desire the web developer 102 or web designer 104 to perform this operation, or he/she might want to complete the task himself/herself. Next, the administrative access can be amended to provide the advertiser 108 with access to the web site, reflected with the new changes (block 2140). While this step may be included when the changes to dbsetup and the JavaScript are performed, other embodiments may desire a manual configuration of the administrative access.

One should note that while this disclosure may generally discuss dbsetup as being accessed by the web designer 104, this is but a nonlimiting example. At least one embodiment includes a scenario where an advertiser 108 has access to dbsetup, as well as the HTML code and JavaScript. Additionally, other embodiments can include a third party with access to any or all of dbsetup, dbupdate, dbq, the HTML code, and the JavaScript. Conversely, at least one embodiment contemplates the advertiser 108 not having access to any administrative functions, such as dbupdate. Any permutation of access is contemplated within this disclosure.

Figure 22:
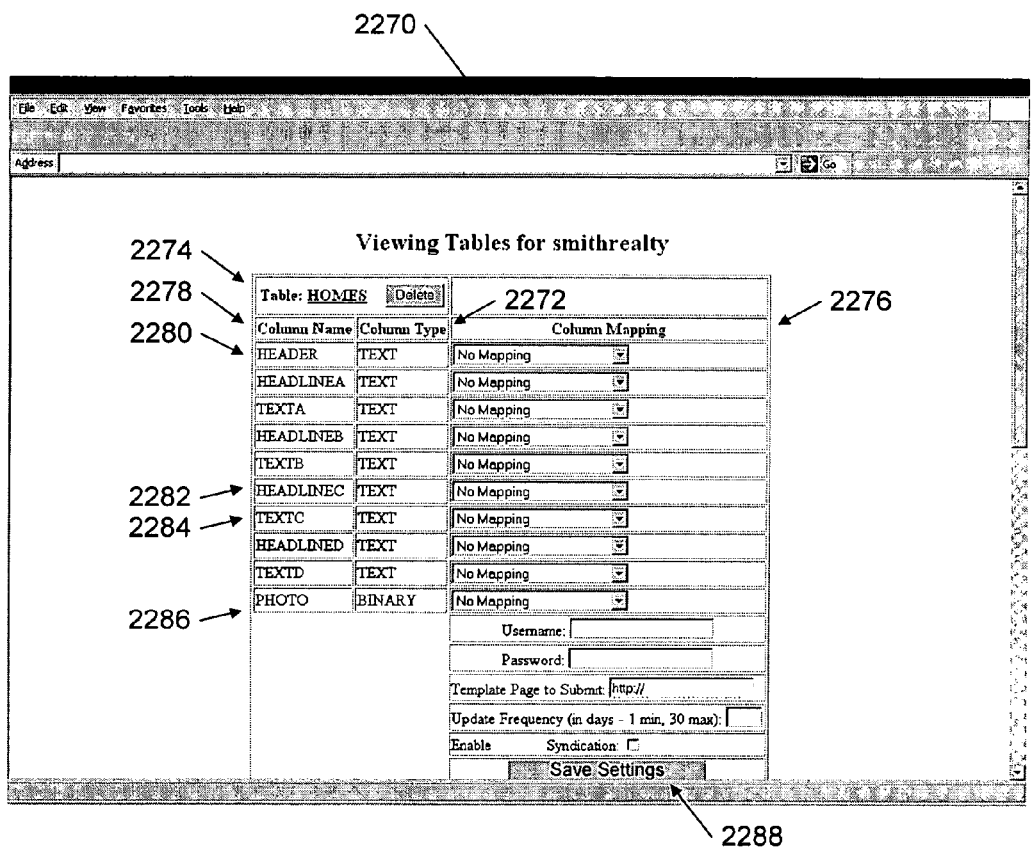
FIG. 22 is a screenshot for an exemplary dbsetup program, illustrating the ability to create dynamic field names for presenting a web site to the end-user from FIG. 2A.

FIG. 22 is a screenshot for an exemplary dbsetup program, illustrating the ability to create dynamic field names for presenting a web site to the end-user from FIG. 2A. Similar to the dbsetup program display from FIGS. 6A, 6b, the window 2270 provides a table name 2274, a column name 2278, a column type 2272, column mapping options 2276, and a save settings option 2288. However, in this nonlimiting example, a header 2280 is present as a column in the table, as well as headlines 2282, text 2284, and photo 2286.

As will be discussed in more detail below, the "headline" and "text" columns can provide the advertiser with the ability to configure column names on a "per entry" basis. As a nonlimiting example, an advertiser may have a table with a first entry and a second entry. The table may include a list of used cars, and varying descriptions about the cars. With the functionality illustrated in FIG. 22, the advertiser can name "headlinea" "gas efficiency." Therefore, if a car with a high gas efficiency is the first entry in the table, the advertiser 108 can enter the car's efficiency in "texta" (with dbupdate). Conversely, if the second entry is a very inefficient car, the advertiser 108 can name "headerlinea" as "driving history" (with dbupdate). This allows an advertiser 108 to name each column for each entry to provide a smoother and more efficient web site.

Figure 23:
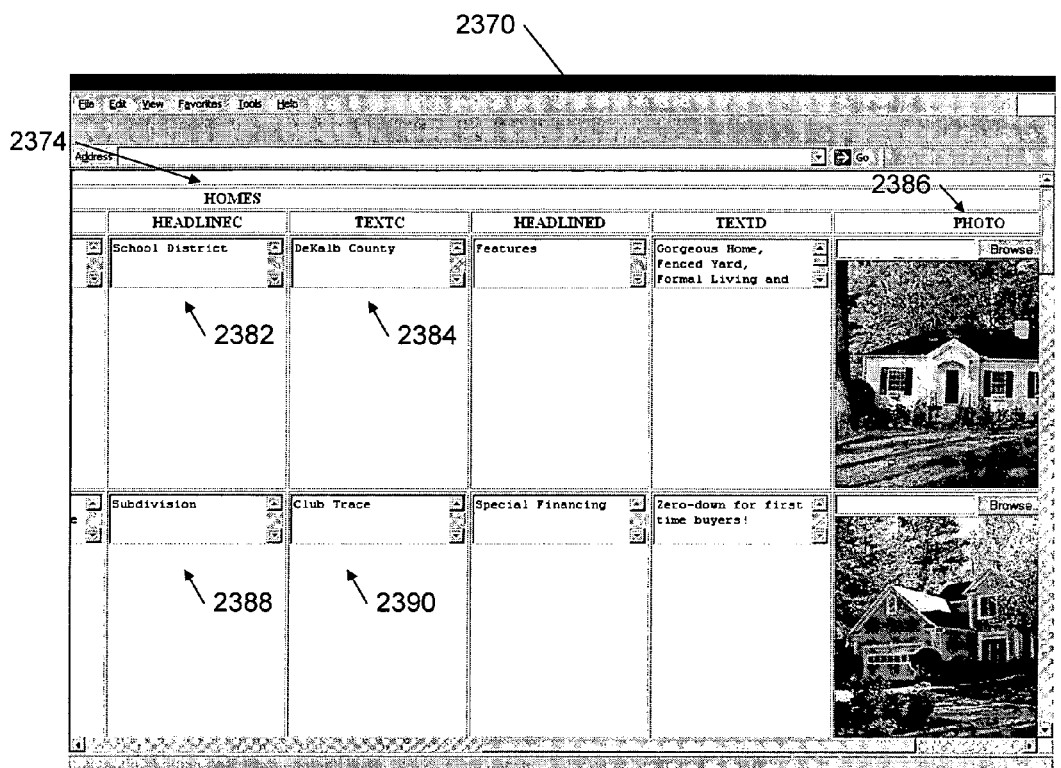
FIG. 23 is a screenshot for an exemplary dbupdate program, illustrating the ability to amend the field names for the fields created in the dbsetup program from FIG. 21.

FIG. 23 is a screenshot for an exemplary dbupdate program, illustrating the ability to amend the field names for the fields created in the dbsetup program from FIG. 21. As illustrated in window 2370, a dbupdate program display of the table "Homes" 2374 is shown. The dbupdate display includes a headline input prompt 2382 that corresponds to the "headlinec" column 2282 from FIG. 22. Similarly, the text input prompt 2384 is also included and corresponds to "textc" 2284 from FIG. 22. Additionally, the photo column 2386 corresponds to the photo column 2286 from FIG. 22.

One should note that the headline display prompts, such as headlinec display prompt 2382 allows the advertiser to designate headline of the text that is being displayed for each entry. More specifically, as shown in FIG. 23, for the first entry, headlinec 2382 includes the text "school district." However, for the second entry, the headlinec 2388 includes the text "subdivision." This allows the advertiser to accentuate the most positive attributes of each entry, without disclosing the negative attributes of an entry. More specifically, if the first entry in window 2370 is located in a desirable school district, the advertiser can designate headlinec 2382 (or any other column) for a school district. The textc column 2384 can then include the school district of the entry. However, if the advertiser 108 knows that the second entry in window 2370 is located in an undesirable school district, the advertiser 108 might not want to bring attention to this fact. The advertiser can then designate headline 2388 for the second entry for subdivision and specify the subdivision in textc 2390. This allows the advertiser 108 to further customize the display for each entry.

Figure 24:
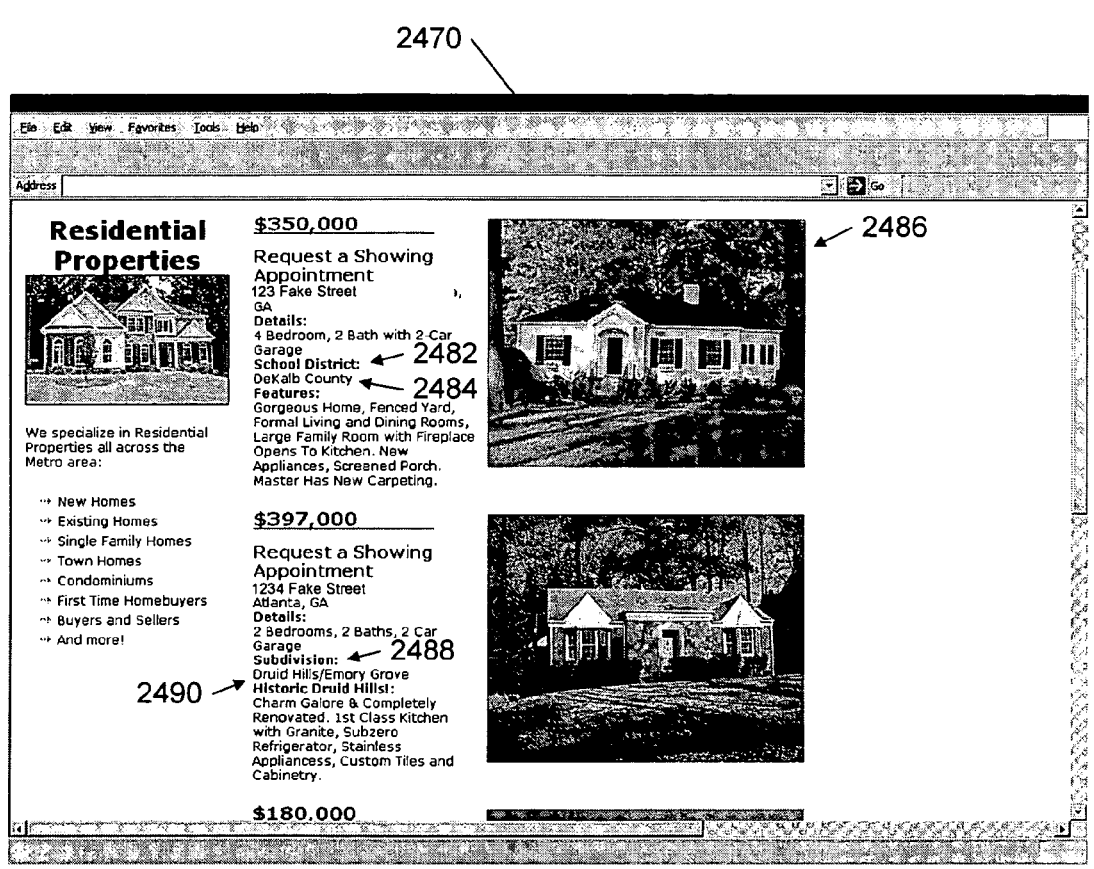
FIG. 24 is a screenshot of an exemplary web page that may be displayed pursuant to the data input in the dbsetup program from FIG. 23.

FIG. 24 is a screenshot of an exemplary web page that may be displayed pursuant to the data input in the dbsetup program from FIG. 23. As illustrated in window 2470, the configuration from FIGS. 22 and 23 permit the dynamic data to be displayed differently for different entries. More specifically, school district line 2482 corresponds to the data that was entered into description input prompt 2382. Similarly, "Dekalb County" 2484 corresponds to the text input prompt 2384. Additionally, the picture 2486 corresponds to the photo input prompt 2386 from FIG. 23.

As discussed with respect to FIG. 23, the "headlinec" field 2388 and "textc" field 2390 for the second entry differs from the "headlinec" field 2382 and "textc" field 2384 for the first entry. Similarly, with respect to FIG. 24, the "headlinec" field 2482 and the "textc" field 2484 also differ in that that the second entry lists "Subdivision" 2488 as the "headlinec" field and "Druid Hills/Emory Grove" 2490 as the "textc" field.

One should note that although the dynamic assigning of column names is described with reference to a real estate web site, this is but a nonlimiting example. Other embodiments can include both web site and non-web site applications.

Figure 25:
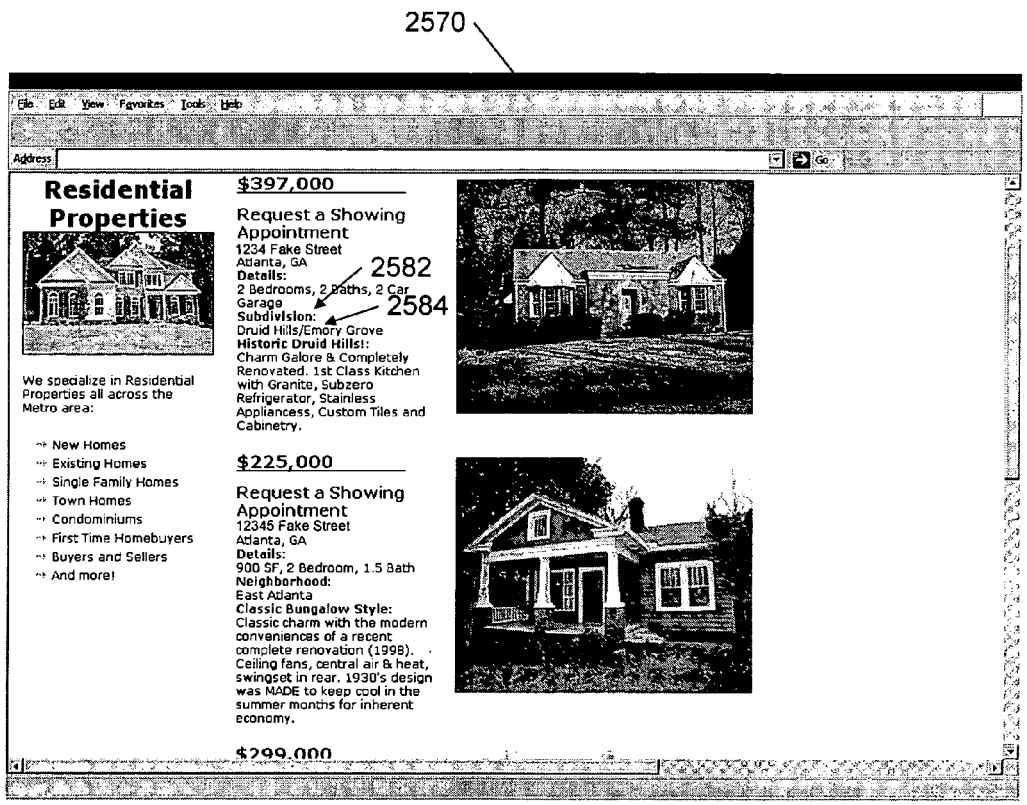
FIG. 25 is a screenshot of an exemplary web page, illustrating the ability to change data presented in the web page from FIG. 24.

FIG. 25 is a screenshot of an exemplary web page, illustrating the ability to change data presented in the web page from FIG. 24. In this nonlimiting example, the web page from FIG. 24 includes the $350,000 house as the first entry. However, in the web page 2570, a random function is implemented to allow the $397,000 house to be listed first. As is noted with elements 2582 and 2584, the data for each entry (house) can be unique.

FIG. 26A is exemplary computer code illustrating a nonlimiting example of HTML that can be created to display dynamic data such as in the web page from FIGS. 13 and 14. More specifically, the HTML below can act as a CGI with encoded JavaScript for displaying dynamic data created by dbsetup, managed by dbupdate, and executed by dbq. More specifically, FIG. 26A illustrates HTML code that a web designer 104 can write for all web sites that incorporate dynamic data as described above. This code 2620 defines the script language as JavaScript. The HTML code then defines the functions "doit," "replace," and "obfu."

FIG. 26B is a continuation of the HTML code from FIG. 26A. The code 2620 in FIG. 26B further creates the individual static components for the web page. More specifically, in this nonlimiting example, the title of the web page is "Sebastian's Italian Restaurant—Italian Restaurants—Jacksonville, Fla." Subsequent lines in the program further demonstrate other content that is displayed on the web page. Additionally, this portion of the HTML defines margins, links, table width, boarders, cell spacing, alignment, colors, fonts, pictures, sizes of tables, etc. The function obfu can be used to encode (obfuscate) the HTML request for the template line, making the template line safe to receive a URL request. The function "replace" is used by the function "obfu" to replace special characters (or reserved characters) that can break the URL request. The function "doit" can provide an option for the designer to create a drill-down option, or to filter the result set (however, this is not shown in this example).

FIG. 26C is a continuation of the HTML code from FIGS. 26A and 26B. FIG. 26C illustrates JavaScript that can be used to display dynamic data on the web page. More specifically, the first part of code 2620 illustrated in FIG. 26C is a variable definition section that can be reused for any web page. The variables "out," "criteria," "loc," "URL," and "page" are defined. Next, the variable "template" is defined. The variable "template" is used to display the dynamic data that was created in dbsetup and updated in dbupdate. More specifically, the variable "template" (line 2626a) defines template as the function "obfu" 2626b (defined in FIG. 26A), with the columns ~DISH~2626c, ~PICTURE~2626d, and ~DESCRIPTION~2626e being displayed. The next line defines the variable "mystr" 2628a, which includes executing in a cgi-bin, a dbq program 2628b for the account "restaurant" (account=restaurant 2628c), and the table "menu" (table=menu 2628d). This JavaScript can dynamically create a request for the dbq program, based on the particular web site table and template. The "document.write" functions can cause the browser to build the script tags and execute the script. When the script is executed, the script can call the dbq program with the selected parameters, and create a variable called "out" that can also be included in this JavaScript (because of a previous run). When the program reaches "document.write(out)", the program can display the data result set returned from dbq, which can contain the formatting based on the template requested with the previous JavaScript.

One should note that while the present example displays all the entries for the above listed columns, this is but a nonlimiting example. The actual table can include more than the columns listed in this code, and those columns can be displayed by adding a ~COLUMN_NAME~ command within the "var template" line 2626a. Additionally, filters can be applied to only display certain entries of the table. As a nonlimiting example, if the table includes data related to cars, such as in Table 1, below, the JavaScript can be amended at the "var mystr" line 2628 to filter out the undesired data.

TABLE 1

| MAKE | MODEL | YEAR | CONDITION |
|------|-------|------|-----------|
| Ford | F-150 | 2001 | Good |
| Dodge | Intrepid | 2004 | Excellent |
| Nissan | Maxima | 2004 | Good |
| Toyota | Avalon | 2002 | Poor |
| Dodge | Stratus | 1996 | Fair |

More specifically, referring to Table 1, if the advertiser wishes that only Dodge cars be displayed, the developer or designer can amend the "var mystr" line 2628a to include make=dodge. This can filter out the other entries in the table to display only the "Dodge" entries. Similarly, if the advertiser wishes to display only one car of each unique make, the developer or designer can include a unique=1 command in the "var mystr" line 2628a. This can filter out entries with a make that is already being displayed. Additionally, a random function can also be applied to the "var mystr" line 2628a. A random=2 command randomly displays two entries from the designated table. A random=3 command randomly displays three entries from the designated table. One should note that in a scenario where the command random =1000 is included where there are only 5 actual records, all 5 records would be returned in random order. One should note that other embodiments may also be included within the scope of this disclosure, such as the ability to sort data within the tables, depending on the particular configuration.

FIG. 26D is a continuation of the HTML code from FIGS. 26A, 26B, and 26C. As illustrated in FIG. 26D, further web page specific data is defined and positioned on the web page. More specifically, a link to the realpages website is provided, as well as an image related to the advertiser. Other data including data related to the advertiser address, email address, copyright information, etc. is also provided.

One should note that the flow charts included herein show the architecture, functionality, and operation of a possible implementation of software. In this regard, each block can be interpreted to represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

One should also note that any of the programs listed herein, which can include an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a non-exhaustive list) of the computer-readable medium could include an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of the certain embodiments of this disclosure can include embodying the functionality described in logic embodied in hardware or software-configured mediums.

It should be emphasized that the above-described embodiments are merely possible examples of implementations, merely set forth for a clear understanding of the principles of this disclosure. Many variations and modifications may be made to the above-described embodiment(s) without departing substantially from the spirit and principles of the disclosure. All such modifications and variations are intended to be included herein within the scope of this disclosure.

Therefore, at least the following is claimed:

1. A method for rendering dynamic data in a web browser, comprising:
   receiving at a web server a first request for an HTML page from a web browser;
   in response to the first request, transmitting to the web browser the HTML page from the web server, the HTML page comprising parameters specifying a criterion, an account name, a table name, a template comprising HTML code and a column name mark associated with a column name, and script language code operative to cause the web browser to partially render the HTML page in the web browser and send a second request for script language code from the web browser to the web server, the second request comprising the account name, the table name, the criterion, and the template;
   receiving the second request at the web server, the web server operatively connected to a database;
   in response to the second request, retrieving from the database one or more rows of data associated with the account name and table name that satisfy the criterion, each of the one or more rows of data comprising a data value associated with the column name;
   for each of the one or more rows of data, generating script language code comprising instructions for rendering the row of data in the web browser according to the template HTML code with the column name mark replaced with the data value; and
   returning the script language code from the web server to the web browser, wherein executing the script language code in the web browser causes the web browser to render the one or more rows of data, and wherein the script language code comprises JavaScript configured to display the dynamic data in the web browser.

2. The method of claim 1, wherein the script language code operative to cause the web browser to send the second request for script language code to the web server comprises an HTML SCRIPT tag including a source parameter specifying a CGI program on the web server.

3. The method of claim 1, wherein the parameters further specify an optional random argument and the method further comprises:
   including the optional random argument in the second request to the web server; and
   retrieving from the database a number of rows of data equal to the optional random argument in a random order.

4. A memory containing executable instructions that, when executed by a computer, causes the computer to:
   receive at a web server a first request for an HTML page from a web browser;
   in response to the first request, transmit the HTML page to the web browser, the HTML page comprising parameters specifying a criterion an account name, a table name, and a template comprising HTML code and a column name mark associated with a column name, and script language code operative to cause the web browser to partially render the HTML page in the web browser and send a second request for script language code from the web browser to the web server, the second request comprising the parameters;
   receive the second request at the web server the web server operatively connected to a database;
   in response to the second request, retrieve from the database one or more rows of data associated with the account name and table name that satisfy the criterion, each of the one or more rows of data comprising a data value associated with the column name;
   for each of the one or more rows of data, generate script language code comprising instructions for rendering the row of data in the web browser according to the template HTML code with the column name mark replaced with the data value; and
   transmit the script language code from the web server to the web browser, the script language code in the web browser operative to cause the web browser to render the one or more rows of data, wherein the script language code comprises JavaScript configured to display the one or more rows of data in the web browser.

5. The memory of claim 4, wherein the script language code operative to cause the web browser to send a second request to the computer comprises an HTML SCRIPT tag including a source parameter specifying a CGI program on the computer.

6. The memory of claim 4, wherein the parameters further specify an optional random argument and the memory contains further executable instructions that cause the computer to retrieve from the database a number of rows of data equal to the optional random argument in a random order.

7. A system for displaying dynamic data in a web browser, comprising:
- a microprocessor;
- an HTML page comprising parameters specifying a criterion, an account name, a table name, a template comprising HTML code and a column name mark associated with a column name, and script language code operative to cause the web browser to:
  - partially render the HTML page in the web browser,
  - send a request for data rendering script code, the request comprising the parameters, and
  - execute the data rendering script code to render the dynamic data in the web browser;
- a web server operative to:
  - receive a request for the HTML page from the web browser, and
  - in response to the request for the HTML page, transmit the HTML page to the web browser; and
- a database query CGI program operative to:
  - receive the request for data rendering script code from the web browser,
  - in response to the request for data rendering script code, retrieve from a database one or more rows of data associated with the account name and table name that satisfy the criterion, each of the one or more rows of data comprising a data value associated with the column name,
  - for each of the one or more rows of data, generating data rendering script code comprising instructions for rendering the row of data in the web browser according to the template HTML code with the column name mark replaced with the data value, wherein the script code comprises JavaScript configured to display the dynamic data in the web browser, and
  - returning the data rendering script code to the web browser.

8. The system of claim 7, wherein the script language code operative to cause the web browser to send a request for data rendering script code comprises an HTML SCRIPT tag including a source parameter specifying the database query CGI program on the web server.

9. The system of claim 7, wherein the parameters further specify an optional random argument and the database query CGI program is further operative to retrieve from the database a number of rows of data equal to the optional random argument in a random order.

* * * * *

UNITED STATES PATENT AND TRADEMARK OFFICE
CERTIFICATE OF CORRECTION

PATENT NO.         : 7,516,153 B2                                                Page 1 of 2
APPLICATION NO. : 11/289256
DATED              : April 7, 2009
INVENTOR(S)        : Keith Hackworth, Aaron Benoy and Robert Smith It is certified that error appears in the above-identified patent and that said Letters Patent is hereby corrected as shown below:

In Claim 4 of U.S. Patent No. 7,516,153, Column 22, line 31, please insert a --,--, after the word 'criterion' and before the word 'an' as shown below:

4.  A memory containing executable instructions that, when executed by a computer, causes the computer to:

receive at a web server a first request for an HTML page from a web browser;

in response to the first request, transmit the HTML page to the web browser, the HTML page comprising parameters specifying a criterion, an account name, a table name, and a template comprising HTML code and a column name mark associated with a column name, and script language code operative to cause the web browser to partially render the HTML page in the web browser and send a second request for script language code from the web browser to the web server, the second request comprising the parameters;

receive the second request at the web server the web server operatively connected to a database;

in response to the second request, retrieve from the database one or more rows of data associated with the account name and table name that satisfy the criterion, each of the one or more rows of data comprising a data value associated with the column name;

for each of the one or more rows of data, generate script language code comprising instructions for rendering the row of data in the web browser according to the template HTML code with the column name mark replaced with the data value; and Signed and Sealed this Fourteenth Day of September, 2010

David J. Kappos
*Director of the United States Patent and Trademark Office* transmit the script language code from the web server to the web browser, the script language code in the web browser operative to cause the web browser to render the one or more rows of data, wherein the script language code comprises JavaScript configured to display the one or more rows of data in the web browser.